US012137340B2

(12) United States Patent
Ben Henda et al.

(10) Patent No.: US 12,137,340 B2
(45) Date of Patent: Nov. 5, 2024

(54) FIRST AND SECOND CONNECTIONS WITH AN AUTHENTICATION MANAGEMENT FUNCTION

(71) Applicant: Telefonaktiebolaget LM Ericsson (publ), Stockholm (SE)

(72) Inventors: Noamen Ben Henda, Stockholm (SE); Vesa Torvinen, Sauvo (FI); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1110 days.

(21) Appl. No.: 16/970,538

(22) PCT Filed: Feb. 15, 2019

(86) PCT No.: PCT/EP2019/053852
§ 371 (c)(1),
(2) Date: Aug. 17, 2020

(87) PCT Pub. No.: WO2019/158708
PCT Pub. Date: Aug. 22, 2019

(65) Prior Publication Data
US 2020/0413258 A1 Dec. 31, 2020

Related U.S. Application Data

(60) Provisional application No. 62/631,702, filed on Feb. 17, 2018.

(51) Int. Cl.
*H04W 12/06* (2021.01)
*H04W 12/037* (2021.01)
(Continued)

(52) U.S. Cl.
CPC ......... *H04W 12/06* (2013.01); *H04W 12/037* (2021.01); *H04W 12/106* (2021.01); *H04W 36/0038* (2013.01)

(58) Field of Classification Search
CPC ..... H04W 12/06; H04W 12/08; H04W 60/00; H04W 76/10; H04W 36/0038;
(Continued)

(56) References Cited

U.S. PATENT DOCUMENTS

| 2013/0242754 A1* | 9/2013 | Shaikh | H04W 24/04 370/242 |
| 2014/0053241 A1* | 2/2014 | Norrman | H04L 63/0876 726/3 |
| 2019/0149453 A1* | 5/2019 | Kephart | H04L 63/1441 726/4 |

OTHER PUBLICATIONS

Ericsson: Discussion on security for multiple NAS connections (Ki #1.7) (Year: 2017).*

(Continued)

*Primary Examiner* — Hitesh Patel
(74) *Attorney, Agent, or Firm* — Baker Botts L.L.P.

(57) ABSTRACT

In some embodiments, a method in a wireless device comprises registering first and second connections with an AMF. The first and second connections share a first security context and connect via first and second access networks, respectively. The method further comprises establishing a second security context with the AMF, setting a flag to a first value based on the second security context having been taken into use on the first connection, and setting the flag to a second value based on the second security context having been taken into use on the second connection. The second value indicates that the second security context has been taken into use on both the first and second connections. The method further comprises retaining the first security context when the flag is set to the first value, and disposing of the first security context after setting the flag to the second value.

16 Claims, 23 Drawing Sheets

(51) Int. Cl.
*H04W 12/106* (2021.01)
*H04W 36/00* (2009.01)

(58) Field of Classification Search
CPC ........... H04W 36/0011; H04W 12/062; H04W 88/08; H04W 12/069; H04W 52/0251; H04W 80/10; H04W 12/61
See application file for complete search history.

(56) References Cited

OTHER PUBLICATIONS

PCT Notification of Transmittal of the International Search Report and the Written Opinion of the International Searching Authority, or the Declaration for International application No. PCT/EP2019/053852—May 20, 2019.
3GPP TS 23.501 v15.0.0; Technical Specification; 3rd Generation Partnership Project; Technical Specification Group Services and System Aspects; System Architecture for the 5G System; Stage 2 (Release 15)—Dec. 2017.
3GPP TS 23.502 v15.0.0; Technical Specification; 3rd Generation Partnership Project; Technical Specification Group Services and System Aspects; Procedures for the 5G System; Stage 2 (Release 15)—Dec. 2017.
3GPP TS 33.401 v15.2.0; Technical Specification; 3rd Generation Partnership Project; Technical Specification Group Services and System Aspects; 3GPP System Architecture Evolution (SAE); Security architecture (Release 15)—Jan. 2018.
3GPP TS 33.501 v0.6.0; Technical Specification; 3rd Generation Partnership Project; Technical Specification Group Services and System Aspects; Security Architecture and Procedures for 5G System (Release 15)—Dec. 2017.
3GPP TR 33.899 v0.6.0; Technical Report; 3rd Generation Partnership Project; Technical Specification Group Services and System Aspects; Study on the security aspects of the next generation system (Release 14)—due to size, this has reference has been split into two parts—Nov. 2016.
3GPP TSG SA WG3 (Security) Meeting #88-Bis; Singapore; Source: Ericsson; Title: Multiple registrations (S3-172555)—Oct. 9-13, 2017.
3GPP TSG SA WG3 (Security) Meeting #90; Gothenburg (Sweden); Source: Ericsson; Title: On the need for multiple NAS SMC procedures (S3-180290)—Jan. 22-26, 2018.
EPO Communication Pursuant to Rule 62 EPC issued for Application No. 21204182.6-1218, 6 pages, Feb. 2, 2022.

* cited by examiner

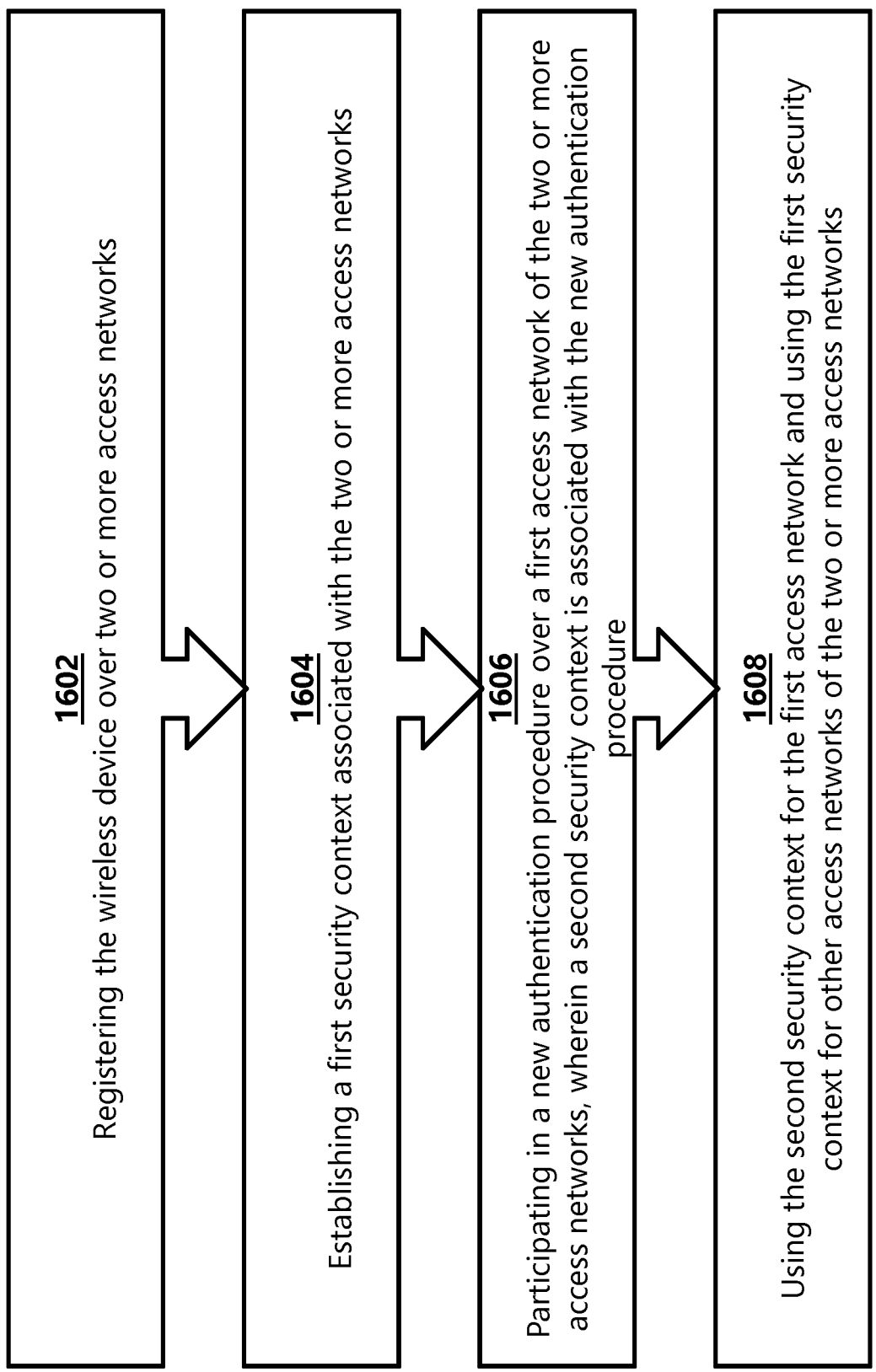

FIRST AND SECOND CONNECTIONS WITH AN AUTHENTICATION MANAGEMENT FUNCTION

PRIORITY

This nonprovisional application is a U.S. National Stage Filing under 35 U.S.C. § 371 of International Patent Application Serial No. PCT/EP2019/053852 filed Feb. 15, 2019 and entitled "First and Second Connections with an Authentication Management Function" which claims priority to U.S. Provisional Patent Application No. 62/631,702 filed Feb. 17, 2018 both of which are hereby incorporated by reference in their entirety.

TECHNICAL FIELD

Certain embodiments of the present disclosure relate, in general, to a wireless device and methods for use therein. Certain embodiments of the present disclosure relate, in general, to a network node providing an authentication management function (AMF) and methods for use therein. More particularly, certain embodiments relate to use of a security context shared by first and second connections between a wireless device and an AMF.

BACKGROUND

In 5G systems, a wireless device, such as a user equipment (UE), may be registered simultaneously to the same Public Land Mobile Network (PLMN) over $3^{rd}$ Generation Partnership Project (3GPP) access and non-3GPP access. For this purpose, it is expected that the UE and the Authentication Management Function (AMF) maintain two Non-Access Stratum (NAS) connections, one for each access type. In such scenarios, 3GPP Technical Specification (TS) 23.501 Version 15.0.0 further describes which elements of the user context in the AMF would be shared among the NAS connections and which would not. For example, there will be multiple Connection Management (CM) and Registration Management (RM) states, one per access type. On the other hand, the temporary identifier will be common.

As described in third generation partnership project (3GPP) Technical Specification (TS) 33.401 V15.2.0, the security mechanisms in legacy systems provide integrity, confidentiality, and replay protection for NAS messages. The NAS security context consists of the Key Access Security Management Entries (KASME) key, the derived protection keys KNASint and KNASenc, the key set identifier eKSI and a pair of counters NAS COUNTs, one for each direction. These security parameters are exclusive to one NAS connection and are refreshed upon the creation of a new KASME, e.g., following an authentication procedure.

Furthermore, the replay protection mechanism, partly realized by the NAS COUNTs, relies on the assumptions that the protocol is reliable and that NAS procedures are run sequentially such that a new procedure is only started after the termination of the current one. This is what guarantees in-order delivery of the NAS messages so that both the UE and the Mobility Management Entity (MME) need only store two values for NAS COUNTs, one per direction. These would be the next and the only expected/accepted values.

As described in 3GPP TS 33.501, V0.6.0 for 5G systems, similar keys and security parameters are used to protect the NAS messages. The KAMF key, the 5G-equivalent of the KASME, is used to derive the lower level NAS keys. Replay protection is provided also by using NAS COUNTs. For the protection of multiple simultaneous NAS connections, it was agreed to share the NAS keys with the following additions. Each NAS connection will be allocated a dedicated pair of NAS COUNTs and, to achieve cryptographic separation, a unique NAS connection identifier that is used when forming one of the inputs to the NAS integrity and confidentiality algorithms. FIG. 1 shows the different inputs to be set when using the confidentiality (or ciphering) algorithm. For example, if this unique NAS connection is used in the BEARER input, then this will guarantee uniqueness of the ciphering stream output.

The activation of the NAS protocol security is realized via a run of the NAS Security Mode Command (SMC) procedure shown in FIG. 2. This is required in order to allow the serving network, more precisely the serving AMF, to negotiate with the UE which algorithms are to be used and also to mark when to start using the keys. For example, consider the scenario where NAS security is already active and the network decides to run a new authentication procedure to refresh the keys.

SUMMARY

There currently exist certain challenges. For example, there are not any known methods to activate security for simultaneous NAS connections. First, to establish a NAS connection over a particular Access Network (AN) type, the UE must run a Registration procedure with the network over that access. As described in 3GPP TS 23.502 V15.0.0, the UE is not allowed to start a parallel Registration procedure over the other access type unless the ongoing Registration procedure is finalized. Therefore, when setting up the NAS connections one at a time using sequential Registration procedures, if a NAS security context is established during the first Registration procedure, then it can be directly taken into use for the other Registration procedure as shown in FIG. 3.

In the example shown in FIG. 3, initially, the UE and the AMF share no security context. The UE registers and authenticates first over AN 1 and then registers over AN 2.
- Step 0. The UE establishes a connection with an Access Network (AN 1)
- Step 1. The UE initiates a registration procedure over AN 1.
- Step 2. The UE and the AMF engage in authentication and NAS SMC procedures that lead to the establishment of a 5G NAS security context identified by an ngKSI of type native (e.g., value 1 in the flow). The NAS COUNTs dedicated to the connection over the AN 1 will have the value 1 due to the run of the NAS SMC. Since, the NAS security context (the NAS keys and the selected NAS algorithms) is shared among the NAS connection, the SMC procedure also implicitly takes the security context into use over the other connection. This is regardless of whether there will be any such connection. From now on, all the NAS messages over the AN 1 will be confidentiality and integrity protected with the NAS security context identified by ngKSI=1.
- Step 3. The AMF sends a Registration Accept to the UE.
- Step 4. The UE establishes a connection with a different type of Access Network (AN 2).
- Step 5. The UE initiates a registration procedure over AN 2. The UE allocates a new pair of NAS COUNTs dedicated to this connection and uses the current NAS security context, identified by the ngKSI=1, to integrity protect the Registration Request message. From now on, all the NAS messages over the AN 2 will be confidentiality and integrity protected with the NAS security context identified by ngKSI=1. The AMF allocates a dedicated pair of NAS COUNTs to this NAS connection and checks the integrity of the received message using the current security context identified by the included ngKSI=1.

Step 6. The AMF sends a Registration Accept to the UE.

Now, in a situation where the UE is registered over both access types and the network decides to trigger an authentication procedure over one connection to refresh the keys, it is unclear how this new security context would be activated for the other connection which is already secured via the shared old context established earlier. This is illustrated in FIG. 4.

Step 0a-0b. The UE registers over AN 1 and AN 2 sequentially, for example, as illustrated in FIG. 3. As result, the UE and the AMF have established and activated a NAS security context which is currently being used to protect the NAS signalling over both NAS connections.

Step 1a-1b. The UE sends a Service Request over AN 1, for example, in response to a paging request. The Service Request procedure is described in clause 4.2.3 of TS 23.502 V15.0.0.

Step 2. In response to the service request, the AMF triggers an authentication procedure. Upon successful authentication, the UE and the AMF establish a partial security context.

Step 3. To activate the newly established partial security context, a NAS SMC run is required. The problem is that NAS signalling might be ongoing on the other NAS connection. Therefore, even if the new context could be activated on the current NAS connection (AN 1), it is not clear when exactly it is activated for the other connection. By relying solely on one NAS SMC run, there is a race condition with implications such as messages protected by the old security context arriving late over AN 2 after the termination of the NAS SMC over AN 1.

One potential solution mandates to always run a NAS SMC to activate a new security context for each NAS connection by a separate NAS SMC run. This may result in unnecessary overhead, e.g., when the Registration procedures are run sequentially (as in FIG. 3) there is no need to perform a NAS SMC to activate the security for the second connection. Another potential solution mandates suspending all NAS signalling on the other connection during a NAS SMC run. This of course has a negative impact on the service quality, for example, because service requests from the UE would be rejected whenever received during the NAS SMC run on the other connection.

Certain aspects of the present disclosure and their embodiments may provide solutions to these or other challenges. Certain embodiments of the proposed solution allow the activation of a new security context over simultaneous NAS connections while minimizing disruption to services by retaining the old security context using a timer or a new intermediary state for the security context until the new security context is active on both connections.

There are, proposed herein, various embodiments which address one or more of the issues disclosed herein. As an example, a wireless device may register over two or more access networks. A first security context may be established and associated with the two or more access networks. The wireless device may participate in a new authentication procedure over a first access network of the two or more access networks. A second security context may be associated with the new authentication procedure. The wireless device may use the second security context for the first access network and use the first security context for other access networks of the two or more access networks. As another example, a network node may register a wireless device over two or more access networks. The network node may establish a first security context associated with the two or more access networks. The network node may participate in a new authentication procedure over a first access network of the two or more access networks. The second security context is associated with the new authentication procedure. The wireless device may use the second security context for the first access network and use the first security context for other access networks of the two or more access networks.

In a first embodiment, a method for use in a wireless device is disclosed. The method comprises registering a first connection and a second connection with an AMF. The first connection connects via a first access network, and the second connection connects via a second access network. The first connection and the second connection share a first security context. The method further comprises establishing a second security context with the AMF, setting a flag to a first value based on the second security context having been taken into use on the first connection, and setting the flag to a second value based on the second security context having been taken into use on the second connection. The first value of the flag indicates to retain and continue to use the first security context on the second connection, the second value of the flag indicates that the second security context has been taken into use on both the first connection and the second connection. The method further comprises retaining the first security context when the flag is set to the first value, and disposing of the first security context after setting the flag to the second value.

In a second embodiment, a wireless device is disclosed. The wireless device comprises processing circuitry configured to register a first connection and a second connection with an AMF. The first connection connects via a first access network, and the second connection connects via a second access network. The first connection and the second connection share a first security context. The processing circuitry is further configured to establish a second security context with the AMF, set a flag to a first value based on the second security context having been taken into use on the first connection, and set the flag to a second value based on the second security context having been taken into use on the second connection. The first value of the flag indicates to retain and continue to use the first security context on the second connection, the second value of the flag indicates that the second security context has been taken into use on both the first connection and the second connection. The processing circuitry is further configured to retain the first security context when the flag is set to the first value, and dispose of the first security context after setting the flag to the second value.

In a third embodiment, a method for use in a network node (e.g., AMF) is disclosed. The method comprises registering a first connection and a second connection of a wireless device. The first connection connects via a first access network, and the second connection connects via a second access network. The first connection and the second connection share a first security context. The method further comprises establishing a second security context for the wireless device, setting a flag to a first value based on the second security context having been taken into use on the first connection, and setting the flag to a second value based on the second security context having been taken into use on the second connection. The first value of the flag indicates to retain and continue to use the first security context on the second connection, the second value of the flag indicates that the second security context has been taken into use on both the first connection and the second connection. The method further comprises retaining the first security context when the flag is set to the first value, and disposing of the first security context after setting the flag to the second value.

In a fourth embodiment, a network node (e.g., AMF) is disclosed. The network node comprises processing circuitry configured to register a first connection and a second connection of a wireless device. The first connection connects via a first access network, and the second connection connects via a second access network. The first connection and the second connection share a first security context. The processing circuitry is further configured to establish a second security context for the wireless device, set a flag to a first value based on the second security context having been taken into use on the first connection, and set the flag to a second value based on the second security context having been taken into use on the second connection. The first value of the flag indicates to retain and continue to use the first security context on the second connection, the second value of the flag indicates that the second security context has been taken into use on both the first connection and the second connection. The processing circuitry is further configured to retain the first security context when the flag is set to the first value, and dispose of the first security context after setting the flag to the second value.

In certain embodiments, any of the first through fourth embodiments described above may include one or more of the following features:

In certain embodiments, the second security context is used for security on the first connection when the flag is set to the first value, and the first security context is used for security on the second connection when the flag is set to the first value.

In certain embodiments, the second security context is used for security on the first connection when the flag is set to the second value, and the second security context is used for security on the second connection when the flag is set to the second value.

In certain embodiments, an SMC procedure is performed over the first access network. The first SMC procedure causes the second security context to be taken into use on the first connection. After performing the first SMC procedure, a second SMC procedure is performed over the second access network. The second SMC procedure causes the second security context to be taken into use on the second connection. The flag is set to the first value after performing the first SMC procedure and before performing the second SMC procedure. The flag is set to the second value occurs after performing the second SMC procedure.

In a fifth embodiment, a method for use in a wireless device is disclosed. The method comprises registering a first connection and a second connection with an AMF. The first connection connects via a first access network, and the second connection connects via a second access network. The first connection and the second connection share a first security context. The method further comprises establishing a second security context with the AMF and associating the second security context with a partial state before the second security context has been taken into use on either the first connection or the second connection. The partial state indicates that the second security context has not yet been taken into use on the first connection and that the second security context has not yet been taken into use on the second connection. The method further comprises moving the second security context from the partial state to an intermediate state after the second security context has been taken into use on the first connection. The intermediate state indicates that the second security context has been taken into use on the first connection and that the second security context has not yet been taken into use on the second connection. The method further comprises moving the second security context from the intermediate state to a full state after the second security context has been taken into use on the second connection. The full state indicates that the second security context has been taken into use on both the first connection and the second connection. The method further comprises retaining the first security context prior to moving the second security context to the full state, and disposing of the first security context after moving the second security context to the full state.

In a sixth embodiment, a wireless device is disclosed. The wireless device comprises processing circuitry configured to register a first connection and a second connection with an AMF. The first connection connects via a first access network, and the second connection connects via a second access network. The first connection and the second connection share a first security context. The processing circuitry is further configured to establish a second security context with the AMF and associate the second security context with a partial state before the second security context has been taken into use on either the first connection or the second connection. The partial state indicates that the second security context has not yet been taken into use on the first connection and that the second security context has not yet been taken into use on the second connection. The processing circuitry is further configured to move the second security context from the partial state to an intermediate state after the second security context has been taken into use on the first connection. The intermediate state indicates that the second security context has been taken into use on the first connection and that the second security context has not yet been taken into use on the second connection. The processing circuitry is further configured to move the second security context from the intermediate state to a full state after the second security context has been taken into use on the second connection. The full state indicates that the second security context has been taken into use on both the first connection and the second connection. The processing circuitry is further configured to retain the first security context prior to moving the second security context to the full state, and dispose of the first security context after moving the second security context to the full state.

In a seventh embodiment, a method for use in a network node (e.g., AMF) is disclosed. The method comprises registering a first connection and a second connection of a wireless device. The first connection connects via a first access network, and the second connection connects via a second access network. The first connection and the second connection share a first security context. The method further comprises establishing a second security context for the wireless device and associating the second security context with a partial state before the second security context has been taken into use on either the first connection or the second connection. The partial state indicates that the second security context has not yet been taken into use on the first connection and that the second security context has not yet been taken into use on the second connection. The method further comprises moving the second security context from the partial state to an intermediate state after the second security context has been taken into use on the first connection. The intermediate state indicates that the second security context has been taken into use on the first connection and that the second security context has not yet been taken into use on the second connection. The method further comprises moving the second security context from the intermediate state to a full state after the second security context has been taken into use on the second connection. The full state indicates that the second security context has been taken into use on both the first connection and the second connection. The method further comprises retaining the first security context prior to moving the second security context to the full state, and disposing of the first security context after moving the second security context to the full state.

In an eighth embodiment, a network node (e.g., AMF) is disclosed. The network node comprises processing circuitry configured to register a first connection and a second connection of a wireless device. The first connection connects via a first access network, and the second connection connects via a second access network. The first connection and the second connection share a first security context. The processing circuitry is further configured to establish a second security context for the wireless device and associate the second security context with a partial state before the second security context has been taken into use on either the first connection or the second connection. The partial state indicates that the second security context has not yet been taken into use on the first connection and that the second security context has not yet been taken into use on the second connection. The processing circuitry is further configured to move the second security context from the partial state to an intermediate state after the second security context has been taken into use on the first connection. The intermediate state indicates that the second security context has been taken into use on the first connection and that the second security context has not yet been taken into use on the second connection. The processing circuitry is further configured to move the second security context from the intermediate state to a full state after the second security context has been taken into use on the second connection. The full state indicates that the second security context has been taken into use on both the first connection and the second connection. The processing circuitry is further configured to retain the first security context prior to moving the second security context to the full state, and dispose of the first security context after moving the second security context to the full state.

In certain embodiments, any of the fifth through eighth embodiments described above may include one or more of the following features:

In certain embodiments, the second security context is used for security on the first connection when the second security context is in the intermediate state, and the first security context is used for security on the second connection when the second security context is in the intermediate state.

In certain embodiments, the second security context is used for security on the first connection when the second security context is in the full state, and the second security context is used for security on the second connection when the second security context is in the full state.

In certain embodiments, a first SMC procedure is preformed over the first access network. The first SMC procedure causes the second security context to be taken into use on the first connection. After performing the first SMC procedure, a second SMC procedure is performed over the second access network. The second SMC procedure causes the second security context to be taken into use on the second connection. Moving the second security context to the intermediate state occurs after performing the first SMC procedure and before performing the second SMC procedure, and moving the second security context to the full state occurs after performing the second SMC procedure.

In a ninth embodiment, a method for use in a wireless device is disclosed. The method comprises registering a first connection and a second connection with an AMF. The first connection connects via a first access network, and the second connection connects via a second access network. The first connection and the second connection share a first security context. The method further comprises performing an SMC procedure with the AMF over the first access network. The SMC procedure performed over the first access network causes a second security context to be taken into use on both the first connection and the second connection. The method further comprises retaining the first security context prior to performing the SMC procedure, and disposing of the first security context after performing the SMC procedure.

In a tenth embodiment, a wireless device is disclosed. The wireless device comprises processing circuitry configured to register a first connection and a second connection with an AMF. The first connection connects via a first access network, and the second connection connects via a second access network. The first connection and the second connection share a first security context. The processing circuitry is further configured to perform an SMC procedure with the AMF over the first access network. The SMC procedure performed over the first access network causes a second security context to be taken into use on both the first connection and the second connection. The processing circuitry is further configured to retain the first security context prior to performing the SMC procedure, and dispose of the first security context after performing the SMC procedure.

In an eleventh embodiment, a method for use in a network node (e.g., AMF) is disclosed. The method comprises registering a first connection and a second connection of a wireless device. The first connection connects via a first access network, and the second connection connects via a second access network. The first connection and the second connection share a first security context. The method further comprises performing an SMC procedure with the wireless device over the first access network. The SMC procedure performed over the first access network causes a second security context to be taken into use on both the first connection and the second connection. The method further comprises retaining the first security context prior to performing the SMC procedure, and disposing of the first security context after performing the SMC procedure.

In a twelfth embodiment, a network node (e.g., AMF) is disclosed. The network node comprises processing circuitry configured to register a first connection and a second connection of a wireless device. The first connection connects via a first access network, and the second connection connects via a second access network. The first connection and the second connection share a first security context. The processing circuitry is further configured to perform an SMC procedure with the AMF over the first access network. The SMC procedure performed over the first access network causes a second security context to be taken into use on both the first connection and the second connection. The processing circuitry is further configured to retain the first security context prior to performing the SMC procedure, and dispose of the first security context after performing the SMC procedure.

In certain embodiments, any of the ninth through twelfth embodiments described above may include one or more of the following features:

In certain embodiments, the first security context is used for security on the first connection and the second connection prior to performing the SMC procedure, and the second security context is used for security on the first connection and the second connection after performing the SMC procedure.

In certain embodiments, a security context retainment timer is started and disposing of the first security context occurs after determining that the security context retainment timer has expired. In certain embodiments, the SMC procedure triggers the starting of the security context retainment timer. In certain embodiments, the second security context for security on the first connection and the second connection after expiry of the security context retainment timer.

In any of the above-described embodiments (first through twelfth embodiments), the first access network and the second access network may be of different types. In certain embodiments, either the first access network or the second access network is a NR access network. In certain embodiments, either the first access network or the second access network is a WiFi network. In certain embodiments, either the first access network or the second access network is a long LTE access network. In certain embodiments, the first access network is a 3GPP-type access network (such as NR or LTE) and the second access network is a non 3GPP-type access network (such as WiFi), or vice versa.

The wireless device described with respect to any of the above embodiments may include any other suitable components, such as memory, an input interface, an output interface, and/or circuitry configured to supply power to the wireless device. Similarly, the network node described with respect to any of the above embodiments may include any other suitable components, such as memory, an input interface, an output interface, and/or circuitry configured to supply power to the network node.

Any of the above-described methods may be performed by a computer program. The computer program comprises instructions which, when executed on a computer, perform a method. In certain embodiments, a computer program product may comprise the computer program. In certain embodiments, a non-transitory computer-readable storage medium may comprise the computer program.

Certain embodiments may provide one or more of the following technical advantages. For example, certain embodiments minimize disruption to services by not retaining the old security context and not rejecting any NAS signalling during the activation of a new context. As another example, certain embodiments allow security to be active for all NAS connections during security context change. As yet another example, certain embodiments optimize the need for an additional NAS SMC run and thus do not increase signalling overhead compared to solutions always requiring a NAS SMC run.

BRIEF DESCRIPTION OF THE DRAWINGS

FIG. 16 illustrates an example of a method, in accordance with some embodiments.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

First Concept: Security Context Retainment Timer

In certain embodiments, the UE establishes two NAS signalling connections with the network. Accordingly, only one NAS SMC procedure may be required to run on one of the NAS signalling connections. In this manner, the same partial security context may be taken into use on each NAS signalling connection.

In certain embodiments, an AMF may be implemented in one or more network nodes in the network. For example, the AMF may be implemented, at least in part, in a core network node of the network. As another example, the AMF may be implemented, at least in part, in a network node other than a core network node.

Figure 5:
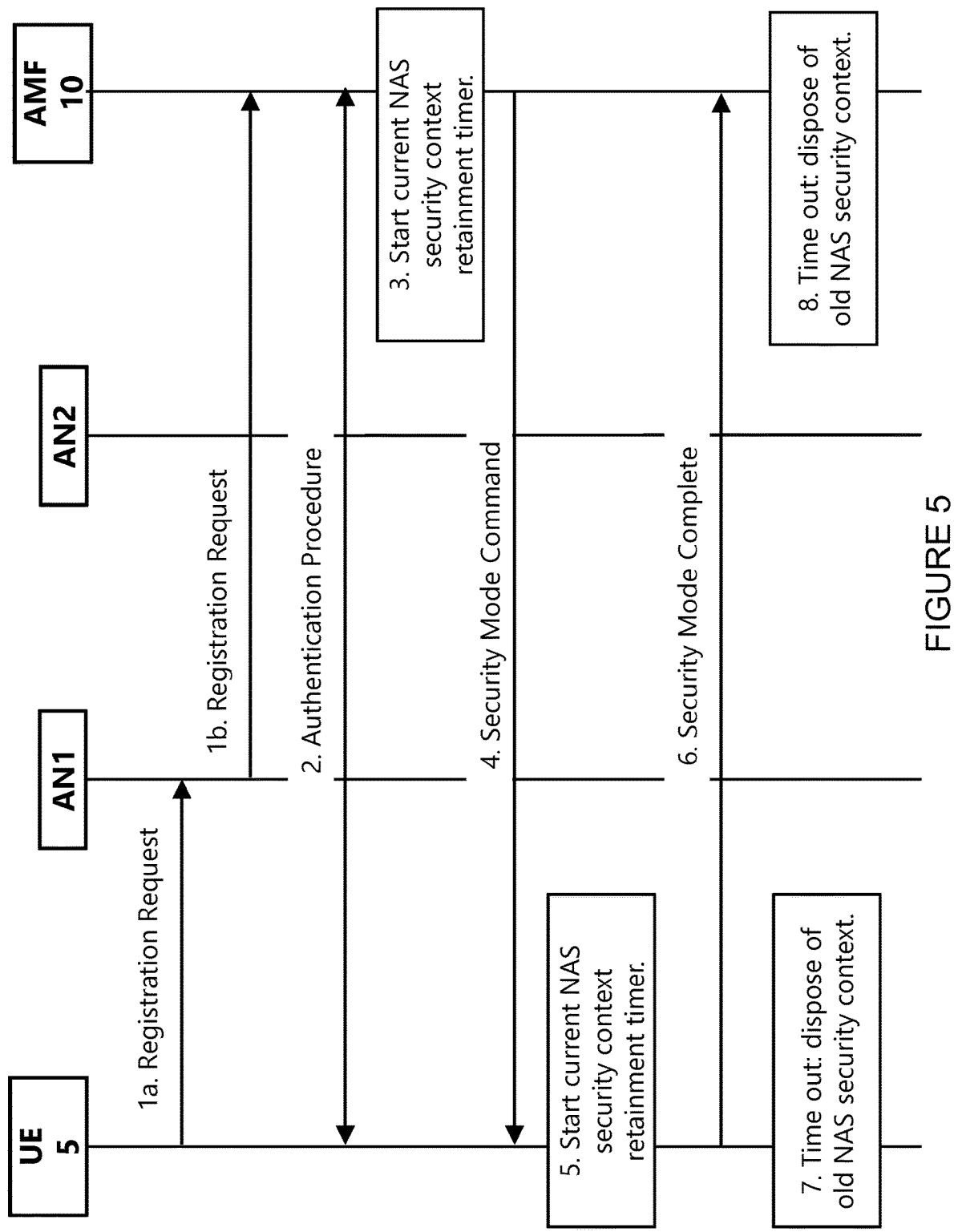
FIG. 5 illustrates an example of a NAS SMC procedure that uses a context retainment timer, in accordance with certain embodiments.

Certain embodiments may be based on using a security context retainment timer which allows control of how long the old security context is retained during a NAS SMC procedure. FIG. 5 illustrates how the timer may be used on the UE and the AMF side in combination with a NAS SMC procedure.

Figure 1:
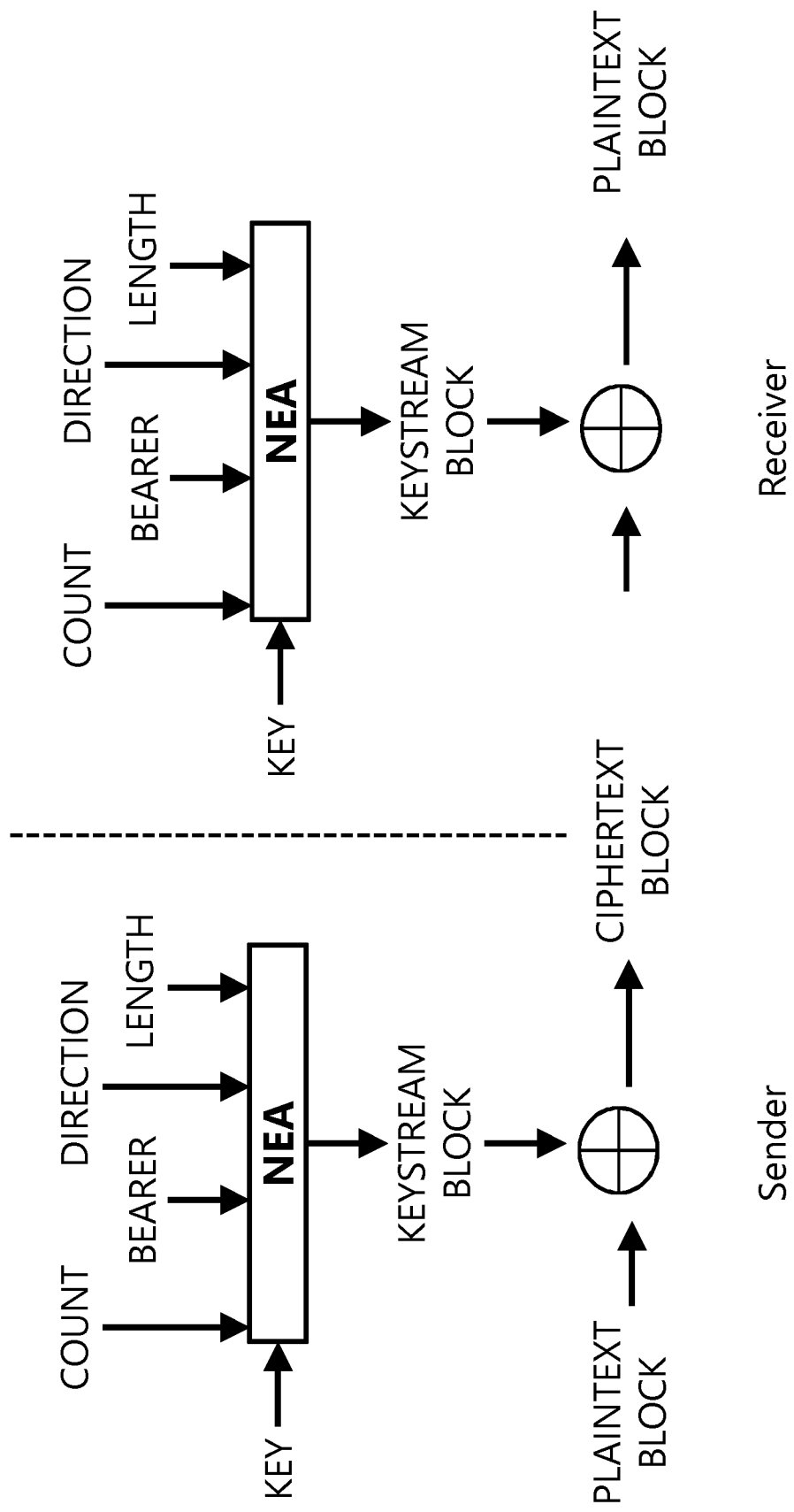
FIG. 1 illustrates an example of a ciphering algorithm interface.
Figure 2:
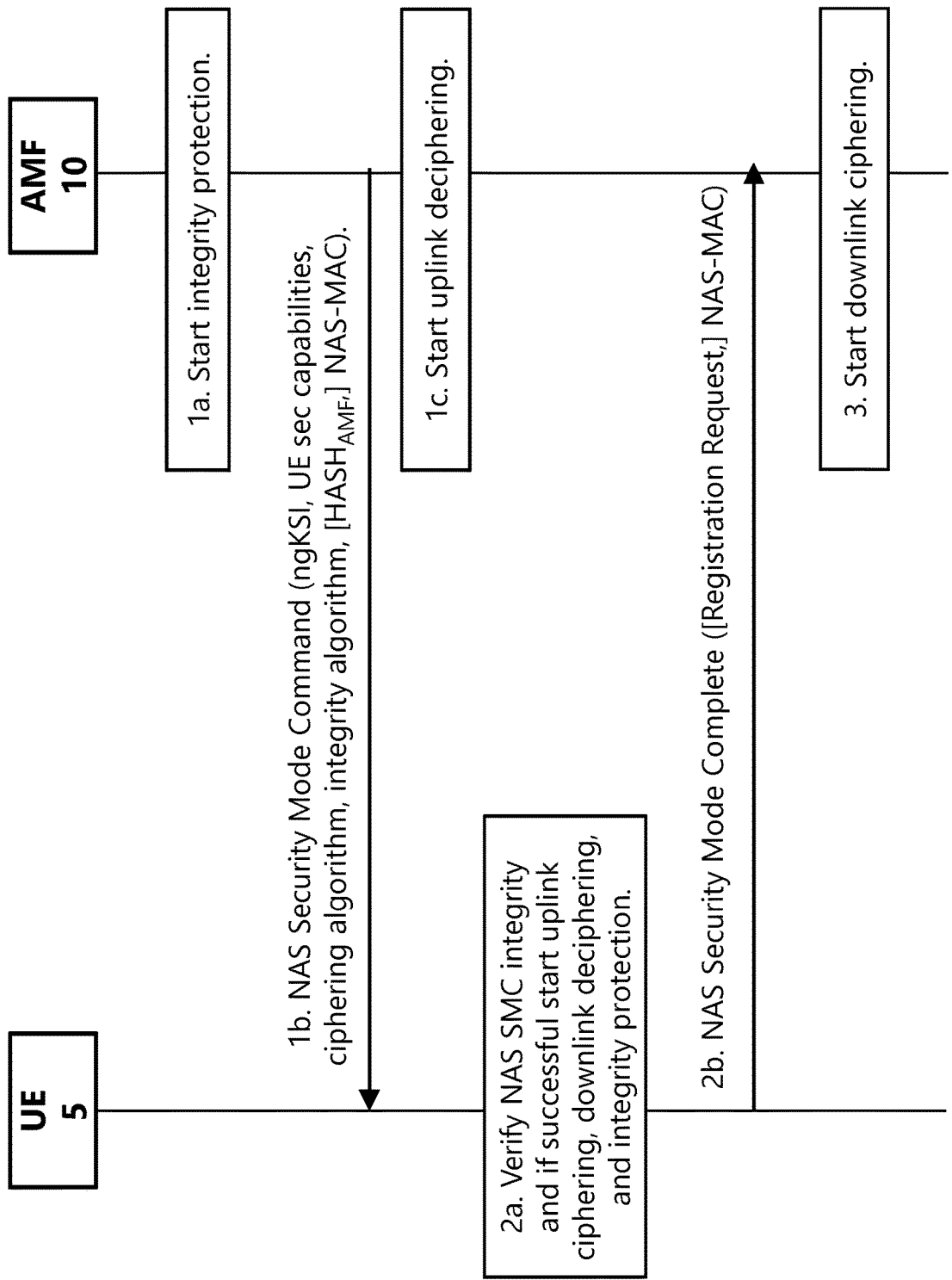
FIG. 2 illustrates an example of a NAS Security Mode Command Procedure.
Figure 3:
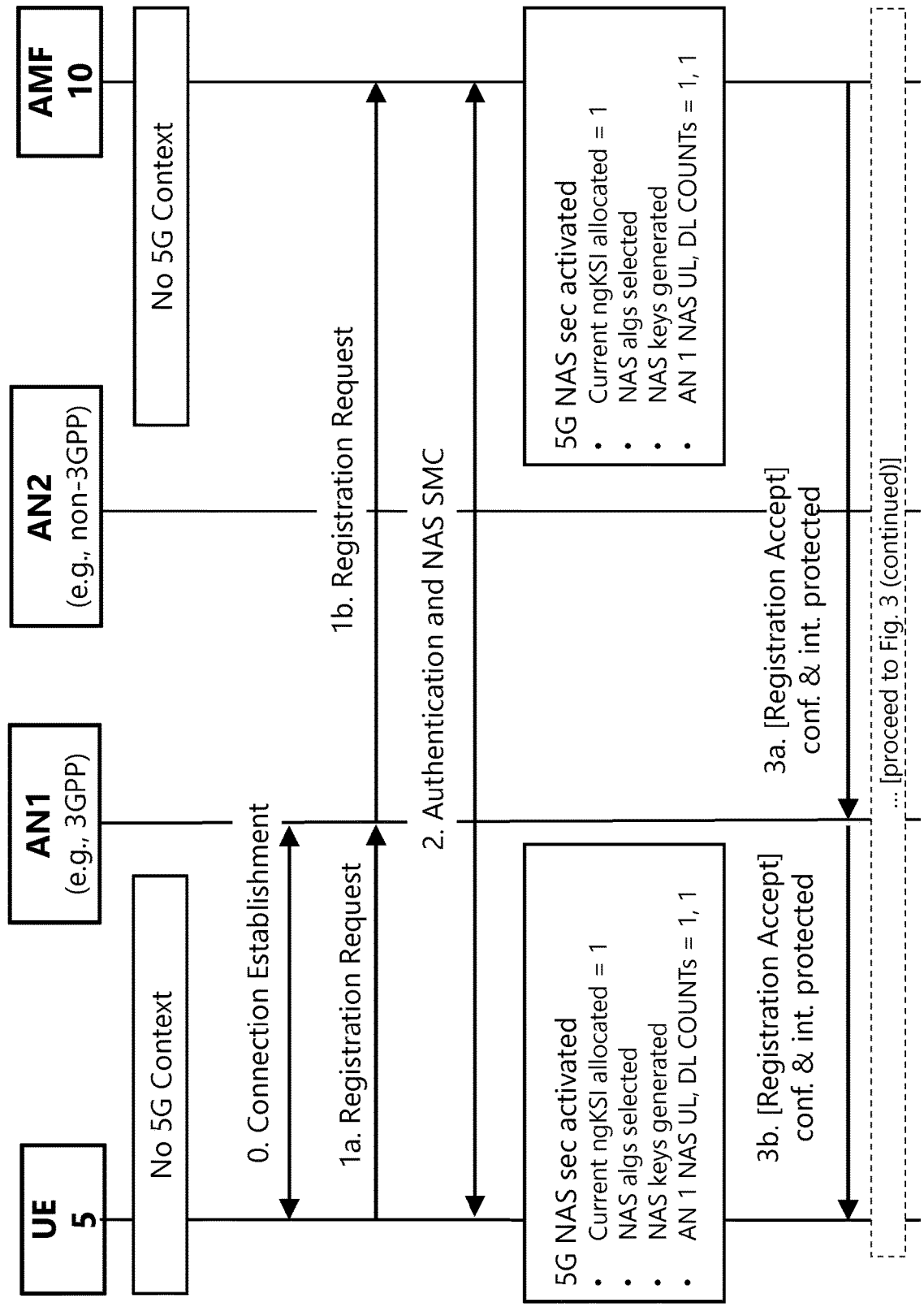
FIG. 3 illustrates an example of an authentication and NAS SMC only during first registration procedure, in accordance with certain embodiments.
Figure 3:
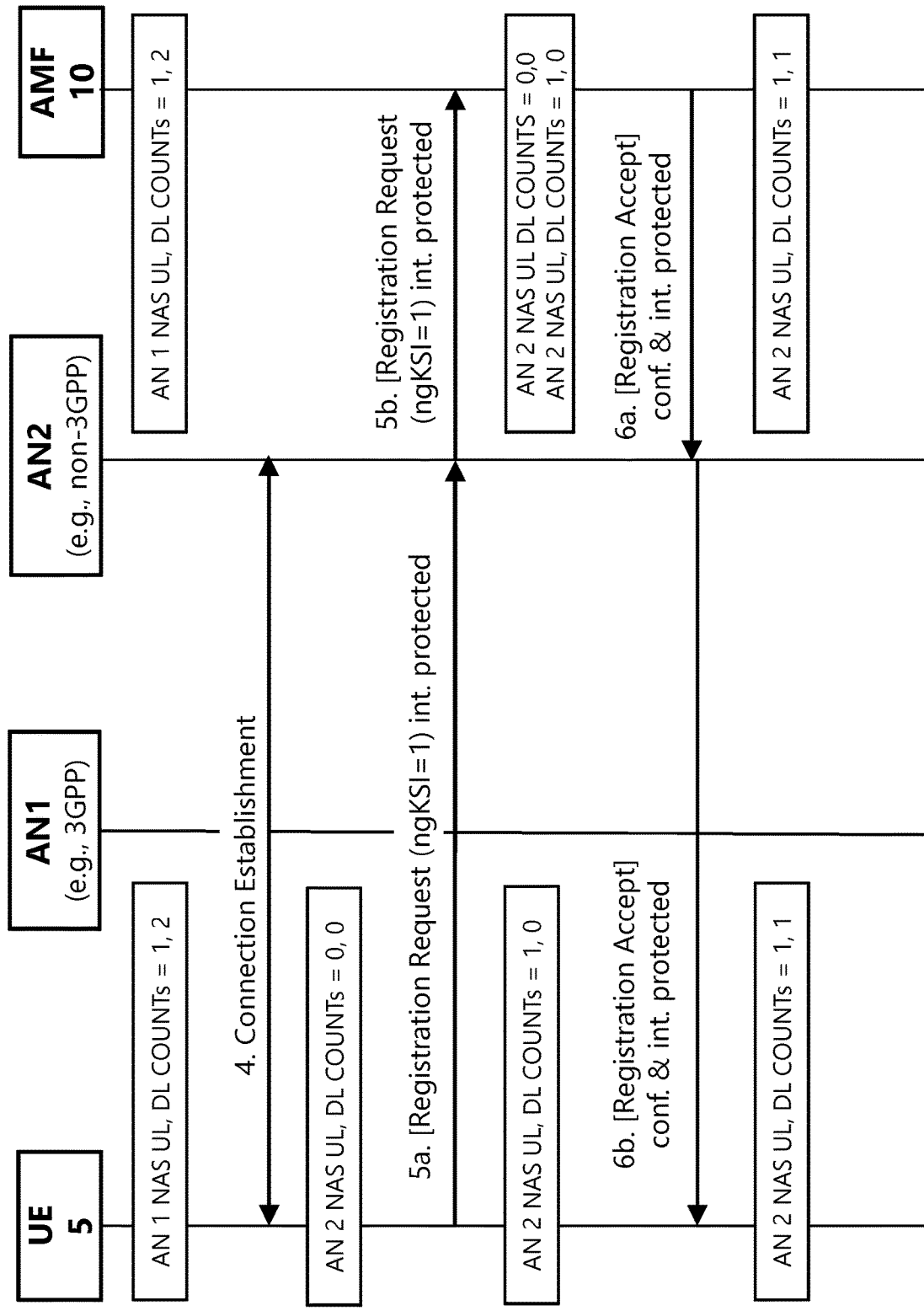
Figure 4:
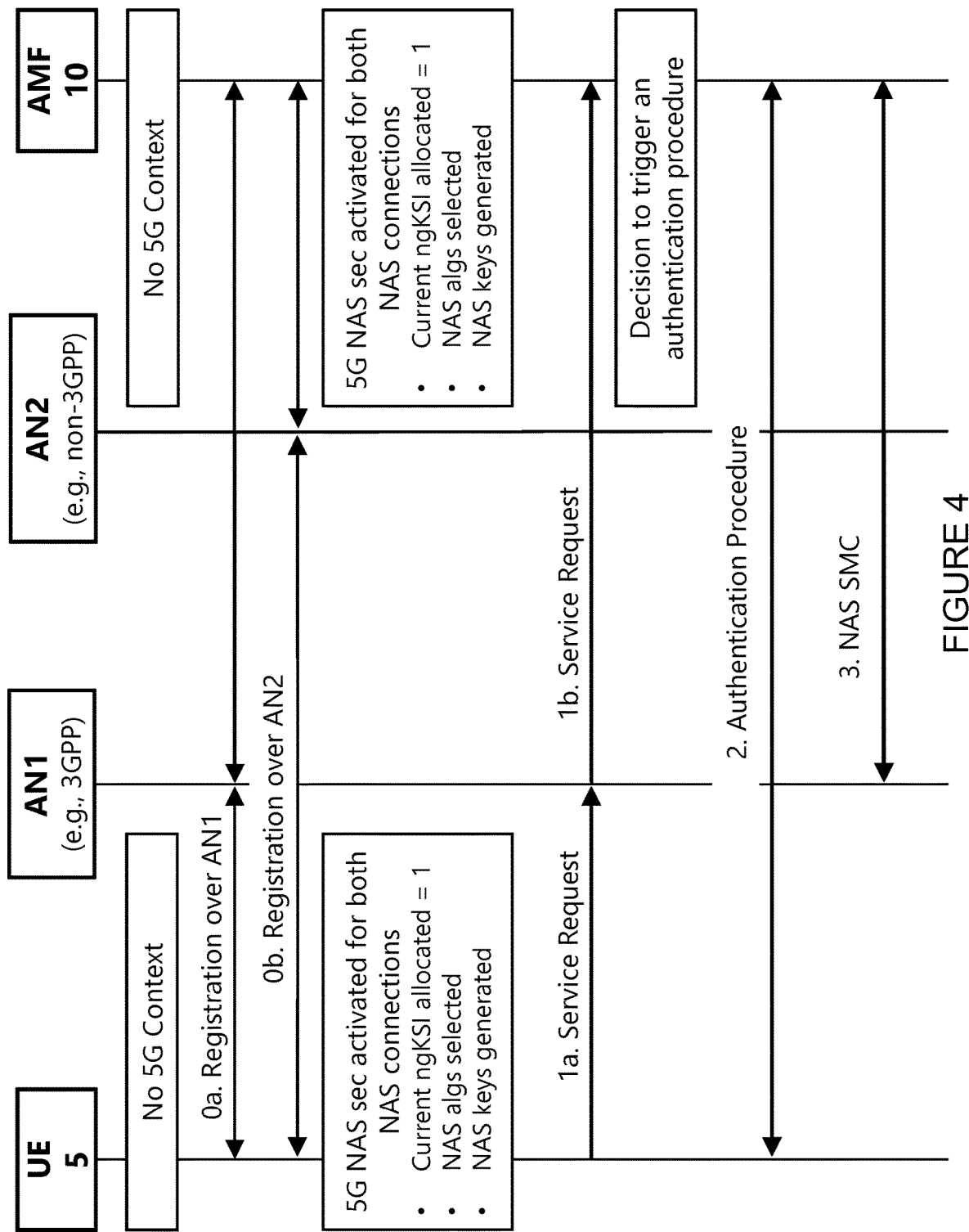
FIG. 4 illustrates an example of an authentication procedure with NAS SMC after registration, in accordance with certain embodiments.

Step 0. The UE registers over both accesses and establishes a security context, for example, as described in FIG. 3.

Step 1. The UE initiates a new Registration procedure over AN 1, e.g., due to mobility, by sending a Registration Request message.

Step 2. The AMF triggers an authentication procedure upon which a new partial security context is established between the UE and the AMF. In the terminology of the 3GPP security standards, being partial denotes the state of a security context that has been just established but not yet activated by a NAS SMC. In such a state, the security context typically lacks certain parameters such as the selected algorithms and the NAS lower level keys. This is because the selected algorithms are negotiated during a NAS SMC run. And the NAS lower level keys are derived using the selected algorithm identifiers.

Step 3. To perform a NAS SMC procedure, the AMF starts the context retainment timer.

Step 4. The AMF sends the NAS Security Mode Command message to the UE.

Step 5. The UE starts the context retainment timer.

Step 6. The UE responds with a NAS Security Mode Complete message to the AMF. Upon completion of this step the security context is active on both NAS connections over AN 1 and AN 2, although the NAS SMC procedure was performed over AN 1. While the context retainment timer is running, the UE and the AMF may still process NAS messages protected by the old security context over AN 2.

Step 7. Once the context timer times out, the UE disposes of old context.

Step 8. Once the context timer times out, the AMF disposes of old context.

Second Concept: Intermediate State Between Partial and Full

In certain embodiments, a UE may establish two NAS signalling connections with the network. Depending on the registration or connection states, two or one NAS SMC's procedure may be run, e.g., one NAS SMC procedure on each NAS signalling connection, to take the same partial security context into use on each NAS signalling connection.

Figure 6:
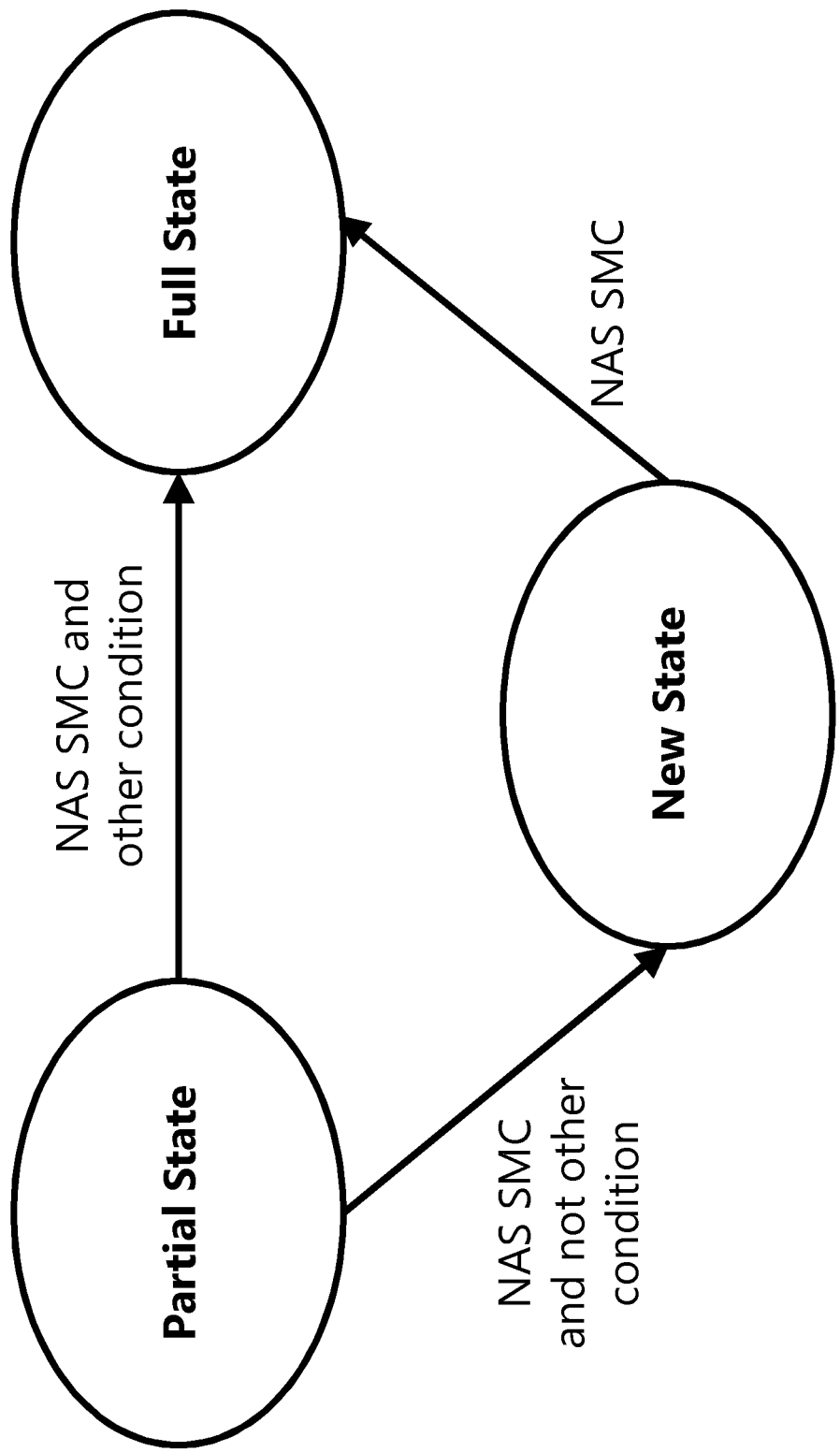
FIG. 6 illustrates an example of a new state for tracking the need of a second NAS SMC run, in accordance with certain embodiments.
Figure 7:
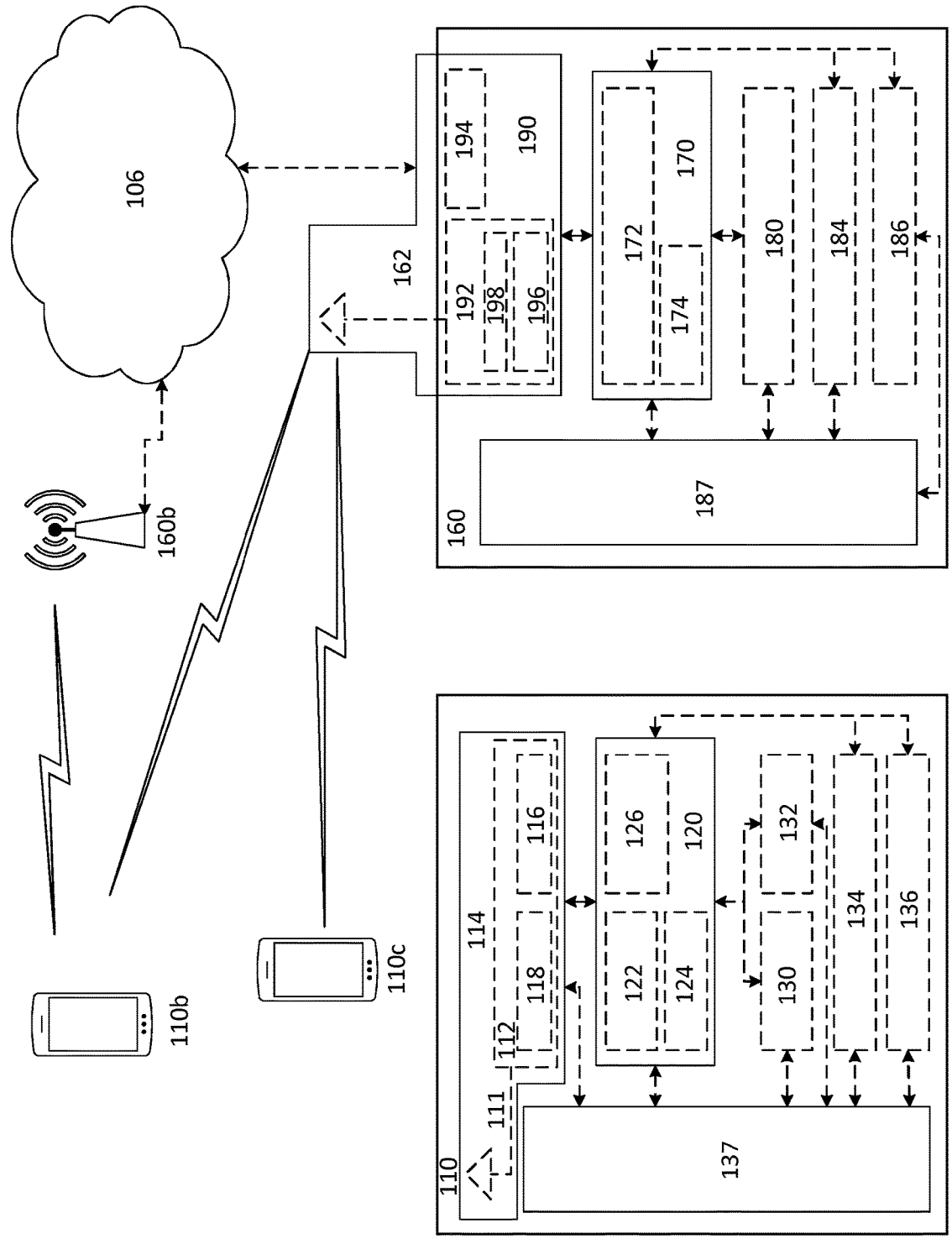
FIG. 7 illustrates an example of a wireless network in accordance with some embodiments.
Figure 8:
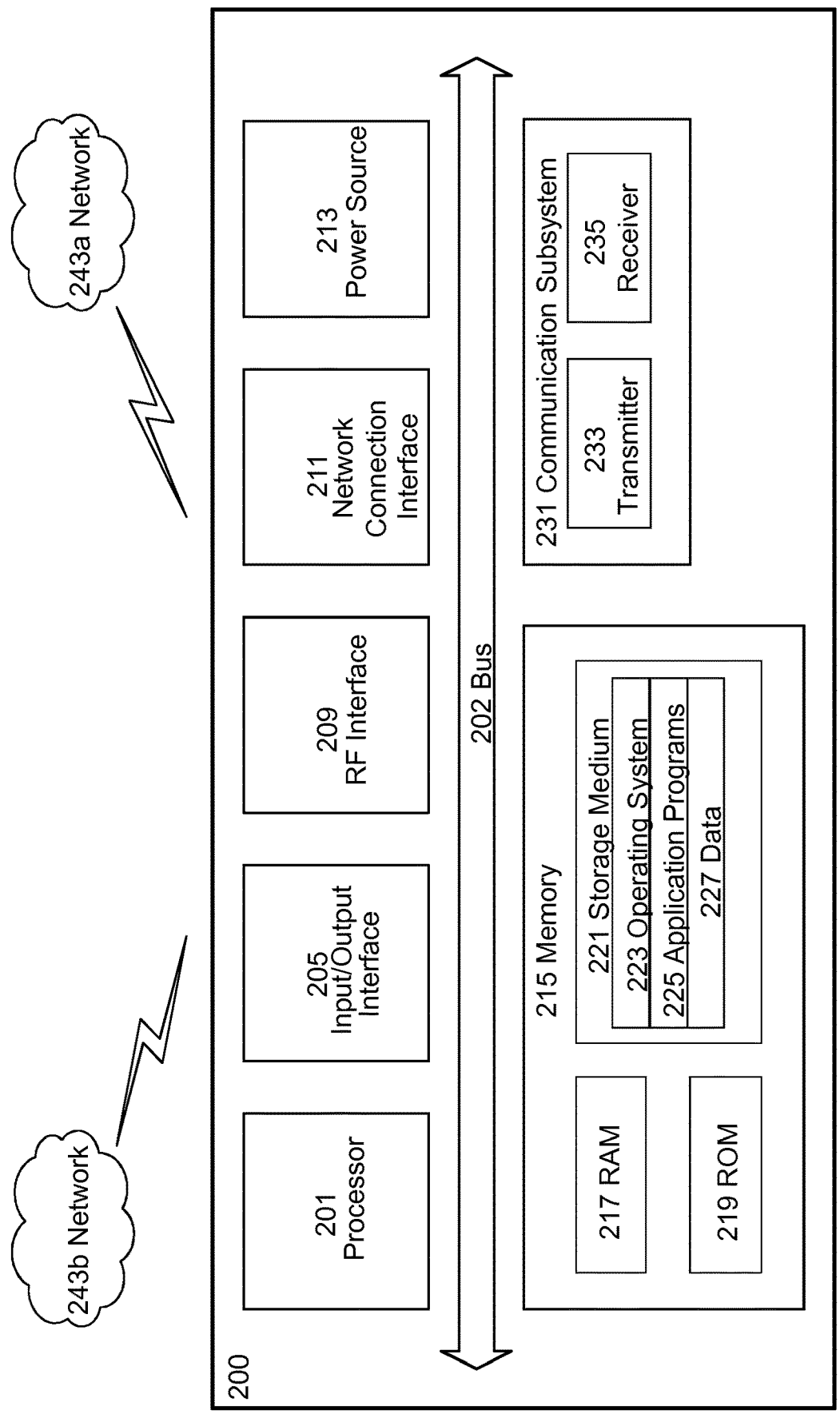
FIG. 8 illustrates an example of User Equipment in accordance with some embodiments.
Figure 9:
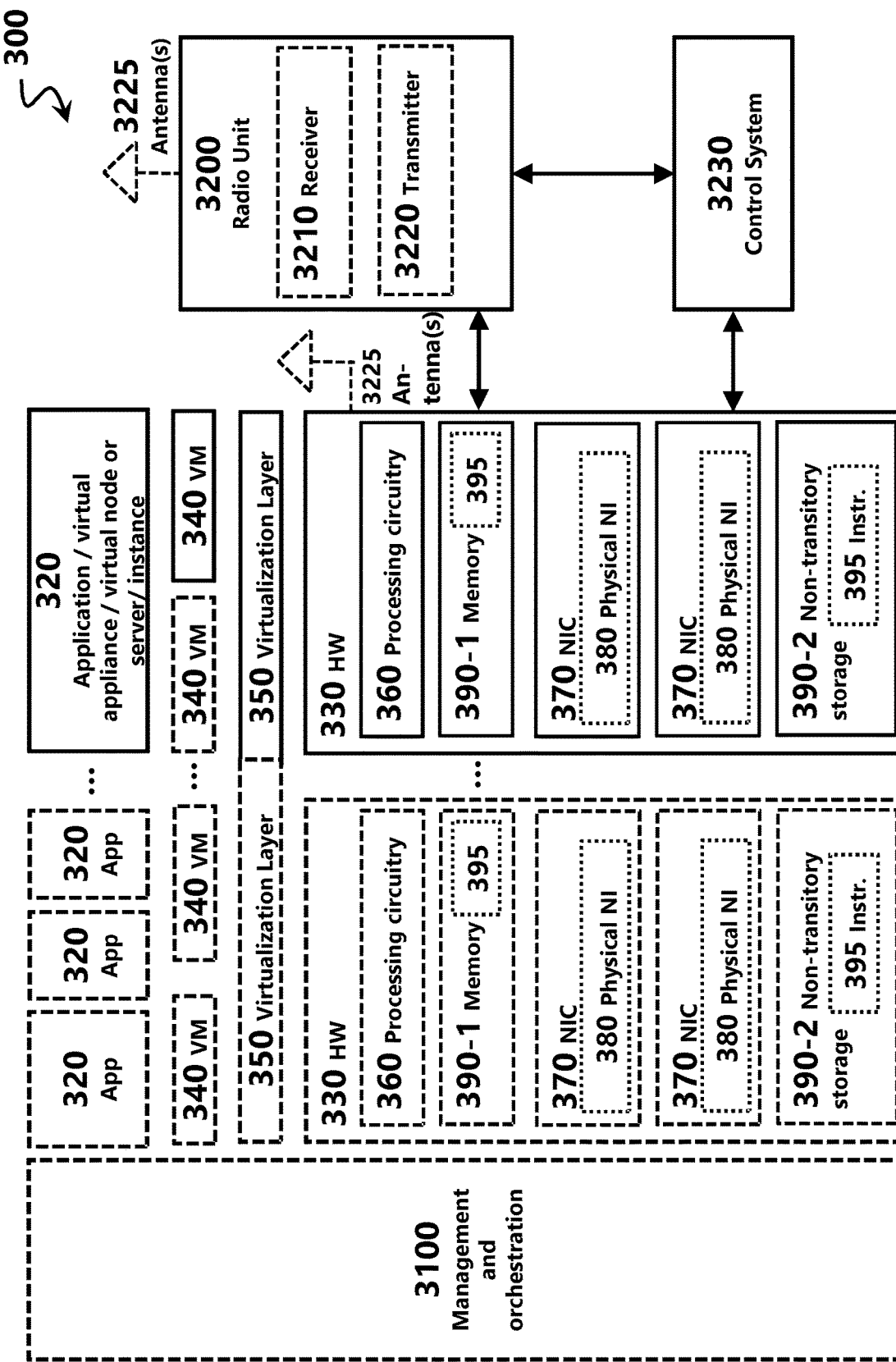
FIG. 9 illustrates an example of a virtualization environment in accordance with some embodiments.

This concept introduces a new state in between partial and full states to better control the behavior of the system when changing the security context after an authentication procedure. A description of partial and full states can be found in TS 33.501. An example of the new state is illustrated in FIG. 6. Upon a successful authentication procedure run, a partial security context is created and established between the UE and the AMF. The new state might only be used when the UE is registered to the network on two or more accesses. For example, if the UE is only registered on one access, then the transition between the partial to full state is realized by a run of the NAS SMC procedure. If the UE is registered on two or more accesses, e.g., on both accesses, on the AMF side, the transition between the states could be based on the following rules:

From Partial to New State: This transition takes place whenever both NAS signalling connections are active, i.e., in state CM CONNECTEDACTIVE as described in TS 23.501, and a NAS SMC is performed over one of the accesses. As long as the new security context is in the New State, the old security context is retained and continues to be used on the other access until a NAS SMC is run on that other access as well.

From New State to Full: This transition takes place whenever a NAS SMC is performed on the other access. Following this transition, the new security context would be used on both accesses and the old security context is no longer needed and thus can be deleted.

From Partial to Full: This transition is performed whenever only one NAS signalling connection is active and a NAS SMC is performed over the active NAS signalling connection.

Certain embodiments do not necessarily rely on the introduction of a new state to track the status of the security context and how far the activation process has proceeded. Certain embodiments may track whether two or one NAS SMC runs are needed to activate the security context smoothly on both NAS connections without any race conditions and without suspension of signalling or any delay to services. A simple Boolean flag may be used for a similar purpose, as explained below.

In certain embodiments, a security context can be in any of three states: partial state, full state (as in legacy behavior), or new state (which may be referred to as a New/Middle/Half/Intermediary/Temporary State). When a security context is initially created, e.g., following a successful authentication procedure, it is in partial state. When a security context is active, e.g., taken into use, it could be in partial state or new state, as described below.

Scenario A: Initial First Registration Over AN 1:

Step 0. The UE is initially not registered to network.

Step 1. The UE sends an Initial Registration Request over a first access network (AN 1), such as a 3GPP type access network.

Step 2. The AMF triggers an authentication procedure upon which a new security context SX1 is created. SX1 is in the partial state.

Step 3. The AMF triggers a NAS SMC run to activate SX1 upon which SX1 is put in the full state. Since there is no other NAS connection in place, there is no risk for a race condition here.

Step 4. The AMF sends a Registration Accept.

Step 5. The UE can potentially send a Registration Request over another Access Network (AN 2), such as a non-3GPP type access network. In this case SX1 is directly taken into use from the beginning. A NAS SMC run over AN 2 would not be required.

Step 6. The UE uses SX1 for procedures requiring a security context on AN 1 and procedures requiring a security context on AN 2.

Scenario B: Periodic Registration or Service Request Over AN 2 while Registered Over AN 1 and 2

Step 0. The UE is registered on both AN 1 and AN 2, for example, as described in Scenario A. Security context SX1 is currently in full state and active on both NAS connections.

Step 1. The UE sends a service request on AN 2, e.g., in response to a paging request. The UE uses SX1 to protect this NAS message.

Step 2. The AMF decides to trigger a new authentication procedure upon which a new security context (SX2) is created in partial state.

Step 3. The AMF triggers a NAS SMC run to activate SX2 upon which SX2 is put in the new state. The reason for putting SX2 in the new state is that because there is already a NAS connection on another access network, there is a risk for a race condition. The AMF and the UE use SX2 to protect the NAS connection over AN 2 but retain and continue to use SX1 on the other NAS connection.

Step 4. The UE happens to trigger a NAS procedure on AN 1, e.g., a service request or a periodic registration. This procedure would still be protected by SX1.

Step 5. The AMF checks the current state of SX2 and because it is in the new state, the AMF triggers a NAS SMC upon which SX2 is put in the full state so that SX2 is activated for both connections. The AMF and the UE can now safely dispose of SX1.

In the context of FIG. 6, a preliminary condition may be that the UE is registered (i.e., in state RM REGISTERED) on both accesses (3GPP and non-3GPP) since there would be a risk of race conditions and relying on one NAS SMC run to activate a new security context on both connections simultaneously can be problematic. One other possibility is to consider the condition that the UE is connected (i.e., in state CM CONNECTED) on both accesses.

Usage of a Flag

Instead of introducing a new state, one can use a Boolean flag to keep track of whether an additional NAS SMC run is required or not. The modified steps in Scenarios A and B would be the following.

In Scenario A, the flag is not needed.

In Scenario B:

Step 3. The AMF triggers a NAS SMC run to activate SX2 upon which SX2 is put in the full state. The AMF and the UE associate a flag to SX2 and set it to true. Since there is already a NAS connection on another access network, there is a risk for a race condition. The AMF and the UE use SX2 to protect the NAS connection over AN 2 but retain and continue to use SX1 on the other NAS connection as the SX2 flag is set. Alternatively, the AMF and the UE associate a flag with SX1 and set it to true. The UE and the AMF retain and continue using SX1 on the other NAS connection as long as the SX1 flag is set.

Step 5. The AMF checks the flag associated with SX2 (alternatively with SX1) and since it is set, the AMF triggers a NAS SMC upon which SX2 is activated for both connections. The AMF and the UE can now safely dispose of SX1 and the flag.

Figure 13:
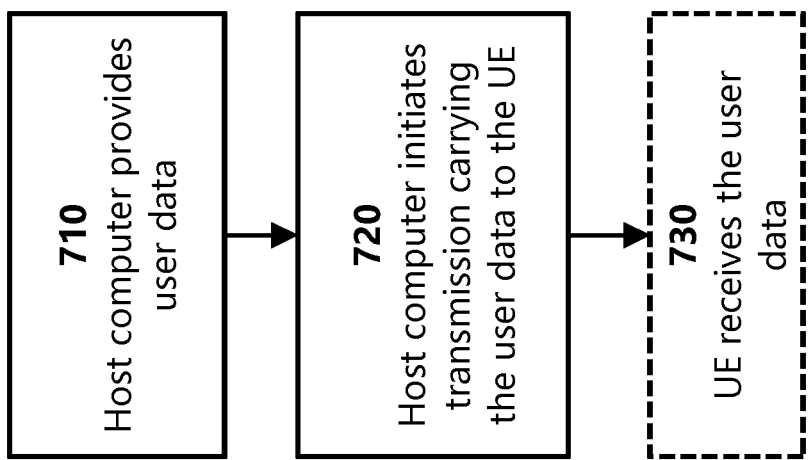
FIG. 13 illustrates an example of methods implemented in a communication system including a host computer, a base station and a user equipment in accordance with some embodiments.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 160 includes processing circuitry 170, device readable medium 180, interface 190, auxiliary equipment 184, power source 186, power circuitry 187, and antenna 162. Although network node 160 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and an RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 13 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 14:
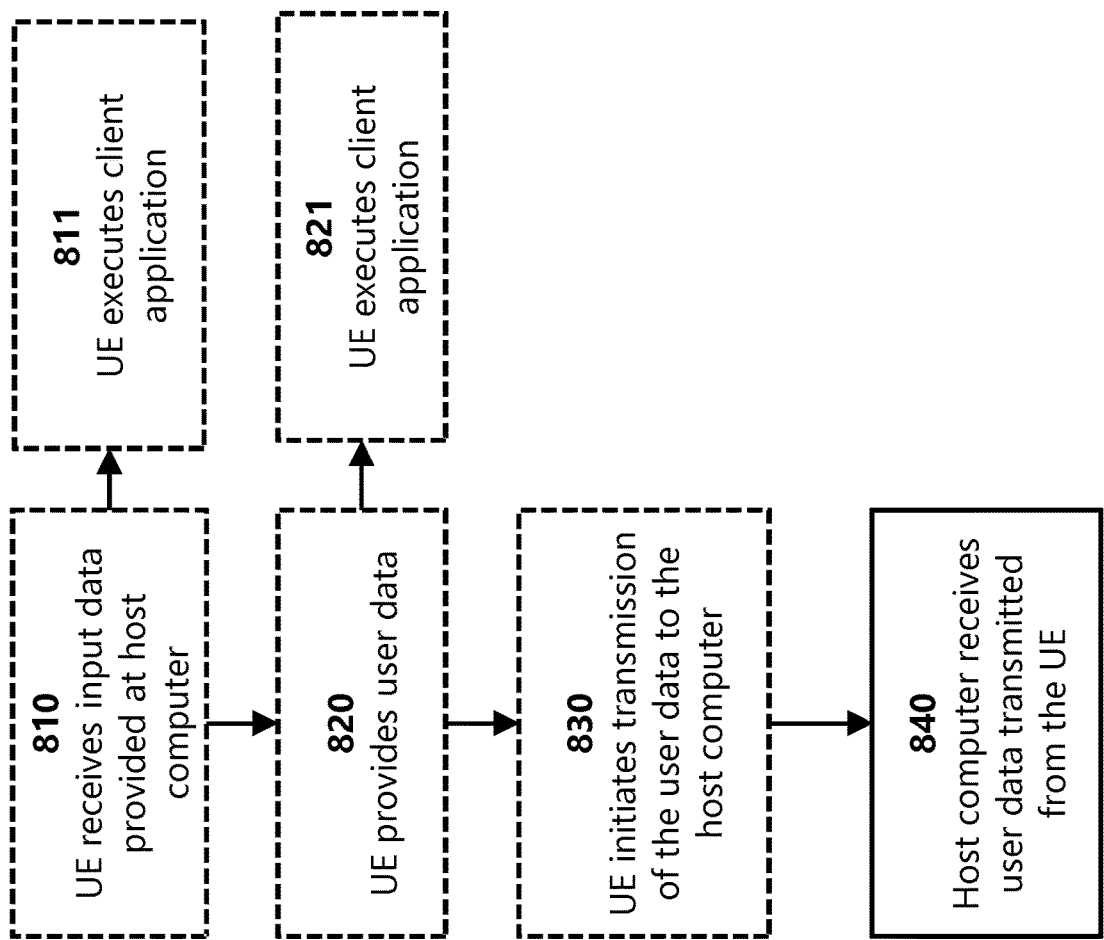
FIG. 14 illustrates an example of methods implemented in a communication system including a host computer, a base station and a user equipment in accordance with some embodiments.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 14, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 15:
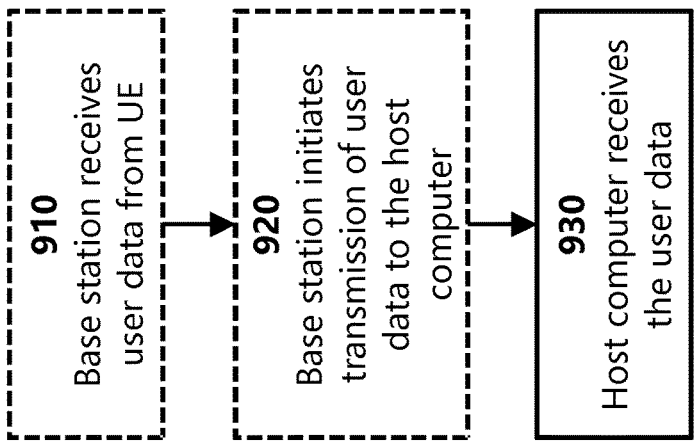
FIG. 15 illustrates an example of methods implemented in a communication system including a host computer, a base station and a user equipment in accordance with some embodiments.

FIG. 15 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 15, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 15.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 10:
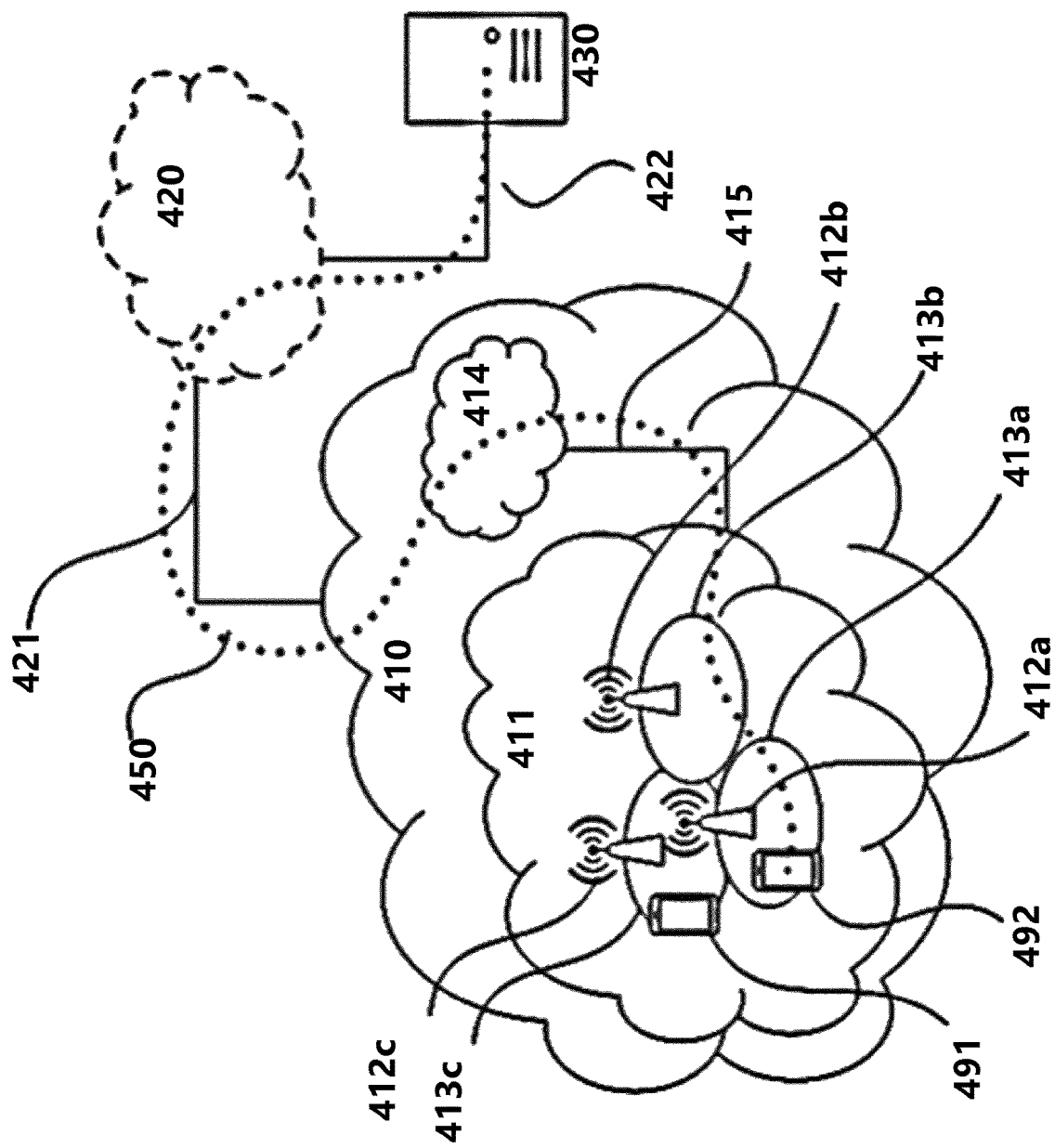
FIG. 10 illustrates an example of a telecommunication network connected via an intermediate network to a host computer in accordance with some embodiments.

With reference to FIG. 10, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by base station 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 11:
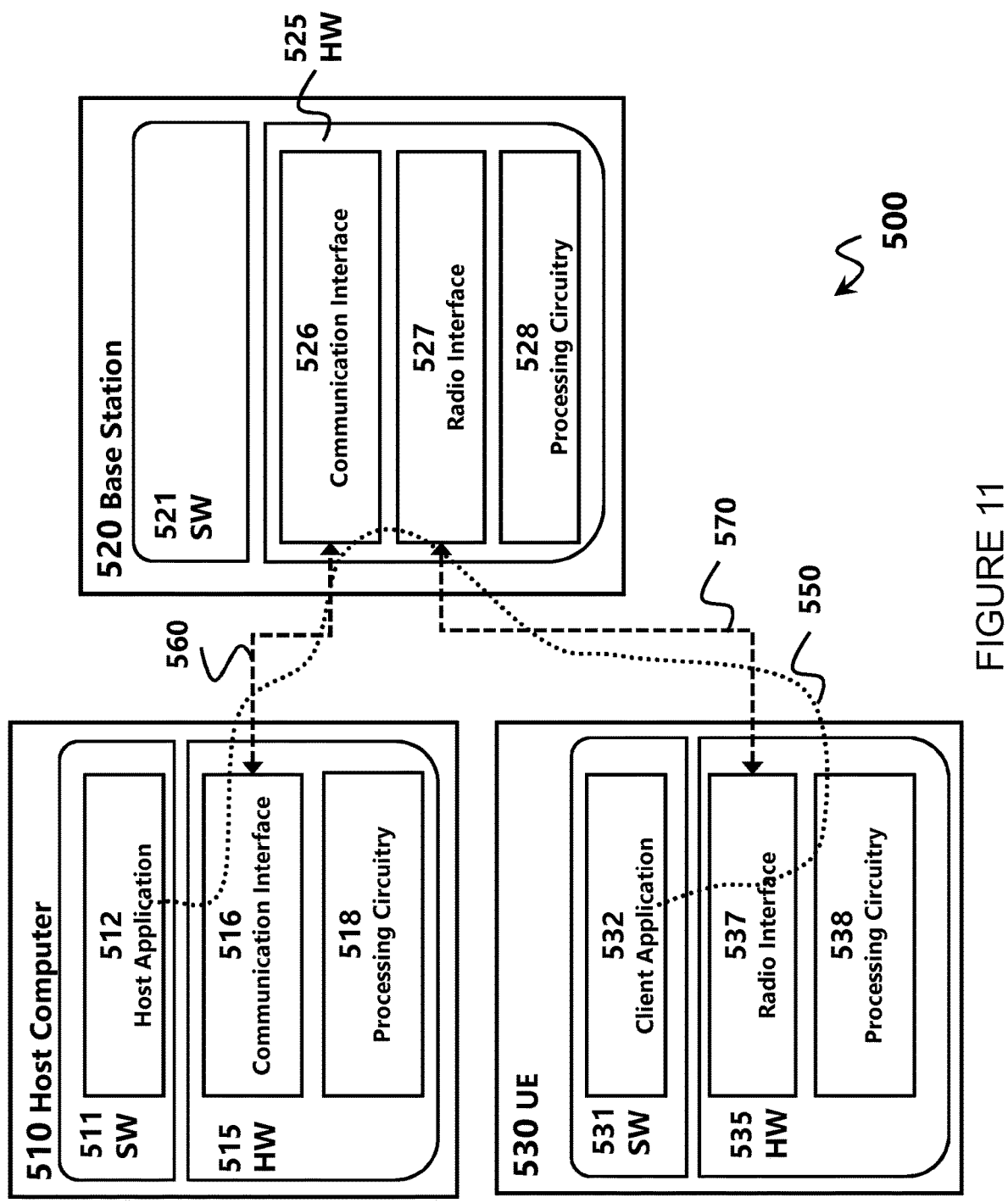
FIG. 11 illustrates an example of a host computer communicating via a base station with a user equipment over a partially wireless connection in accordance with some embodiments.

It is noted that host computer 510, base station 520 and UE 530 illustrated in FIG. 11 may be similar or identical to host computer 430, one of base stations 412a, 412b, 412c and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, increase security of connections, and reduce latency and thereby provide benefits such as reduced user waiting time, better responsiveness, and a reduced security risks on connections.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 12:
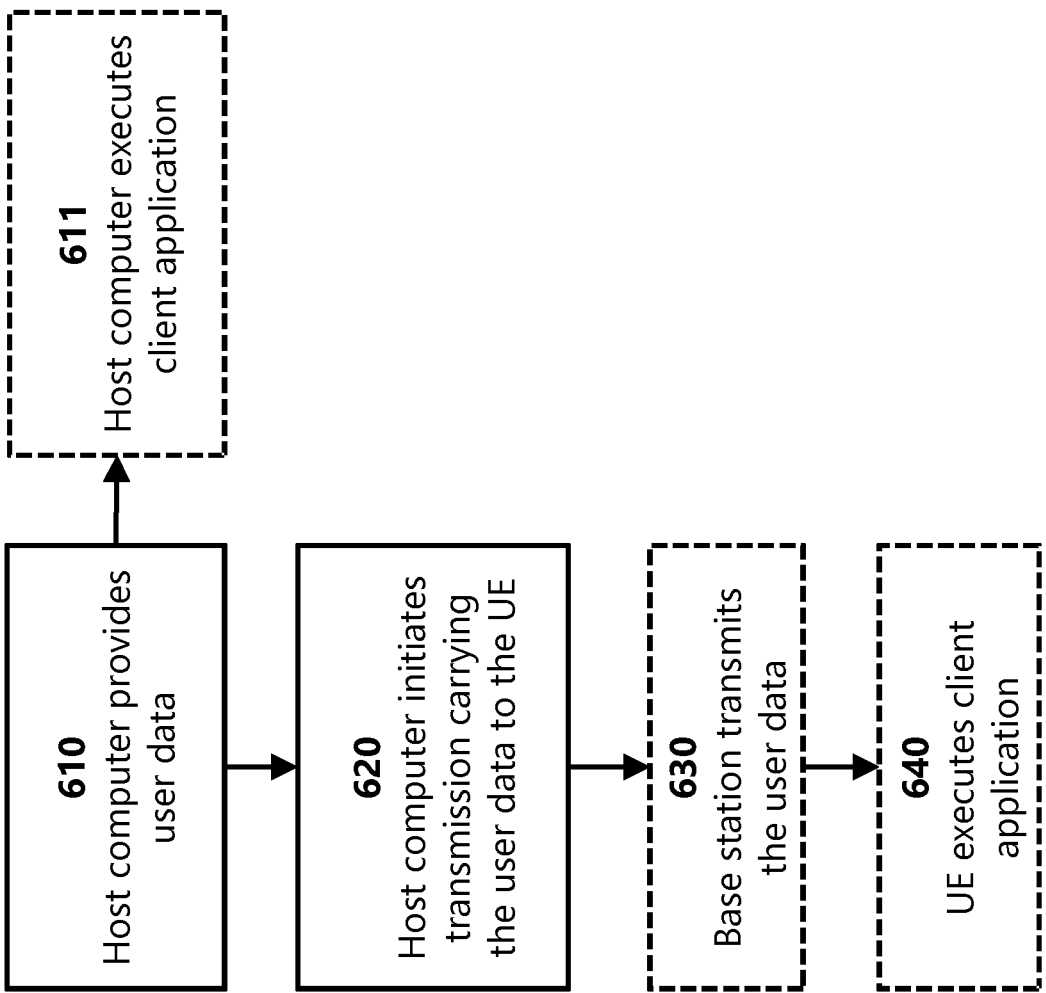
FIG. 12 illustrates an example of methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

FIG. 16 depicts a method, in accordance with some embodiments. The method begins at step 1602 with registering the wireless device over two or more access networks. The method may move to step 1604 with establishing a first security context associated with the two or more access networks. For example, the wireless device may use the first security context when accessing each of the two or more access networks. The method may move to step 1606 with participating in a new authentication procedure over a first access network of the two or more access networks. For example, the wireless device or a network node may initiate a new registration or authentication in response to the circumstances of the wireless device and access networks. A second security context is associated with the new authentication procedure. For example, the second security context may be associated with the first access network on which the new authentication procedure the wireless device is participating. At step 1608, the wireless device may use the second security context for the first access network and may use the first security context for other access networks of the two or more access networks.

Figure 17:
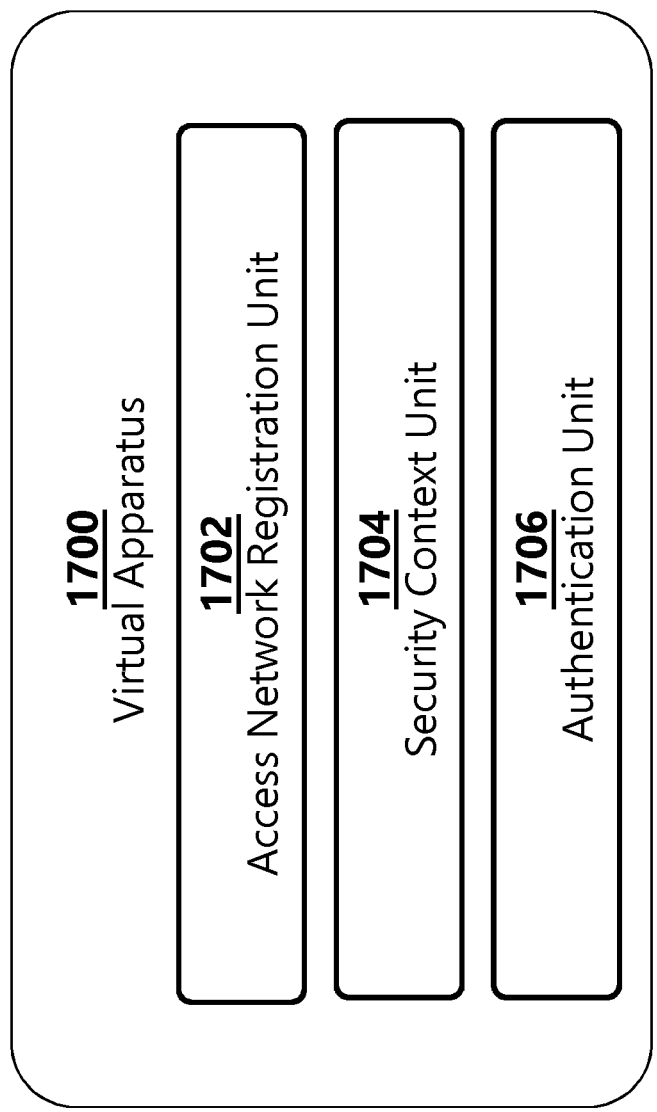
FIG. 17 illustrates an example of a virtualization apparatus, in accordance with some embodiments.

FIG. 17 illustrates a schematic block diagram of an apparatus 1700 in a wireless network (for example, the wireless network shown in FIG. 13). The apparatus may be implemented in a wireless device or network node (e.g., wireless device 110 or network node 160 shown in FIG. 13). Apparatus 1700 is operable to carry out the example method described with reference to FIG. 16 and possibly any other processes or methods disclosed herein. It is also to be understood that the method of FIG. 16 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Access Network Registration Unit 1702, Security Context Unit 1704, Authentication Unit 1706 and any other suitable units of apparatus 1700 to perform corresponding functions according one or more embodiments of the present disclosure.

As illustrated in FIG. 17, apparatus 1700 includes Access Network Registration Unit 1702, Security Context Unit 1704, and Authentication Unit 1706. Access Network Registration Unit 1702 is configured to register the wireless device over two or more access networks. Security Context Unit 1704 is configured to establish a first security context associated with the two or more access networks. Authentication Unit 1706 is configured to participate in a new authentication procedure over a first access network of the two or more access networks. For example, Authentication Unit 1706 may be configured to initiate a new registration or authentication in response to the circumstances of the wireless device and access networks. A second security context is associated with the new authentication procedure. For example, the second security context may be associated with the first access network on which the new authentication procedure the wireless device is participating. Apparatus 1700 may use the second security context for the first access network and may use the first security context for other access networks of the two or more access networks.

Figure 18:
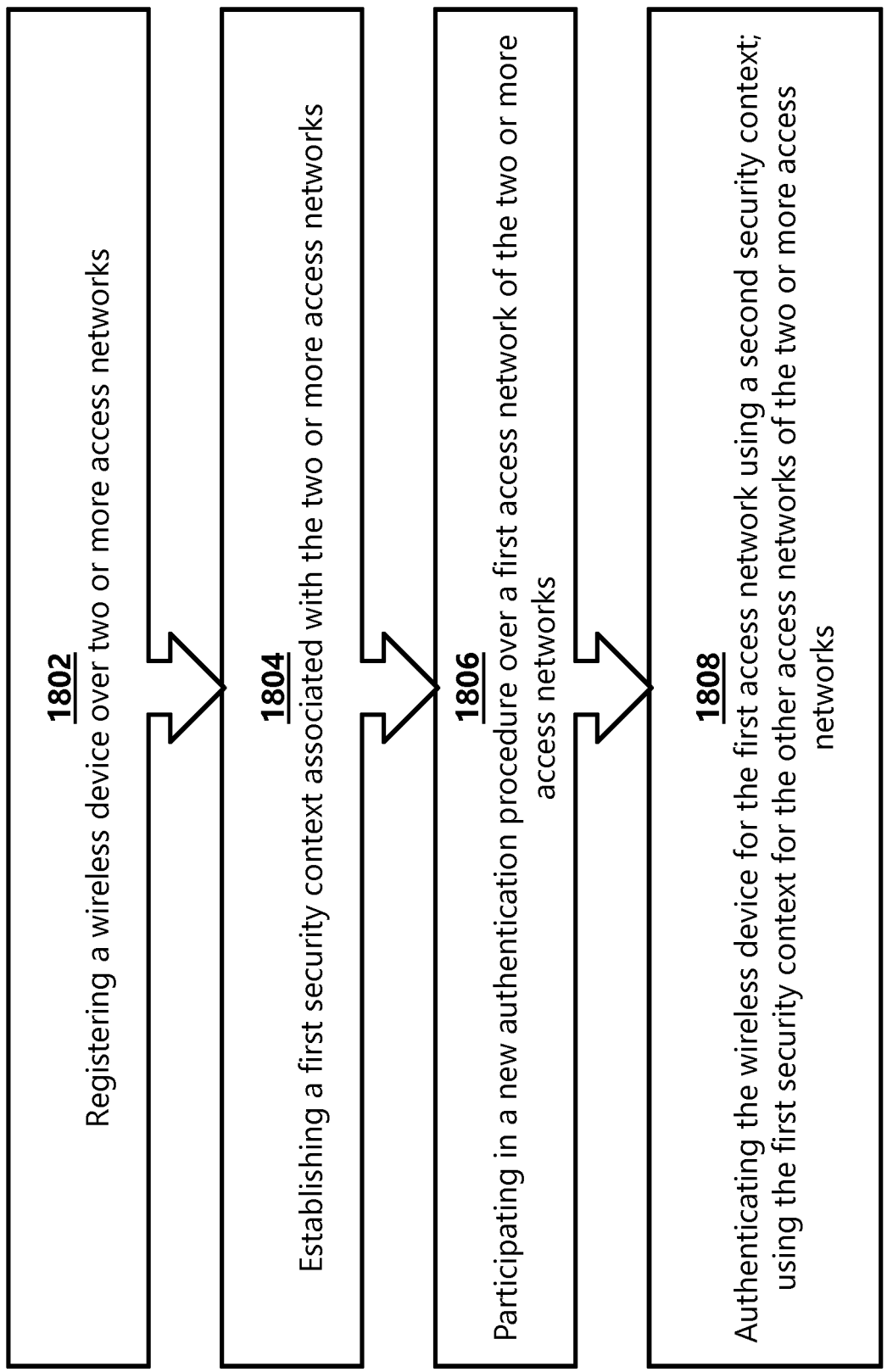
FIG. 18 illustrates an example of a method, in accordance with some embodiments.

FIG. 18 depicts a method, in accordance with particular embodiments. The method begins at step 1802 with registering a wireless device over two or more access networks. The method may move to step 1804 with establishing a first security context associated with the two or more access networks. For example, the first security context may be used by the wireless device when accessing each of the two or more access networks. The method may move to step 1806 with participating in a new authentication procedure over a first access network of the two or more access networks. For example, the network node may initiate a new registration or authentication in response to the circumstances of the wireless device and access networks. A second security context is associated with the new authentication procedure. For example, the second security context may be associated with the first access network on which the new authentication procedure the wireless device is participating. The method may move to step 1808 with authenticating the wireless device. For example, a network node may authenticate the wireless device for the first access network using the second security context. The network node may also authenticate the wireless device for the other access networks of the two or more access networks using the first security context.

Figure 19:
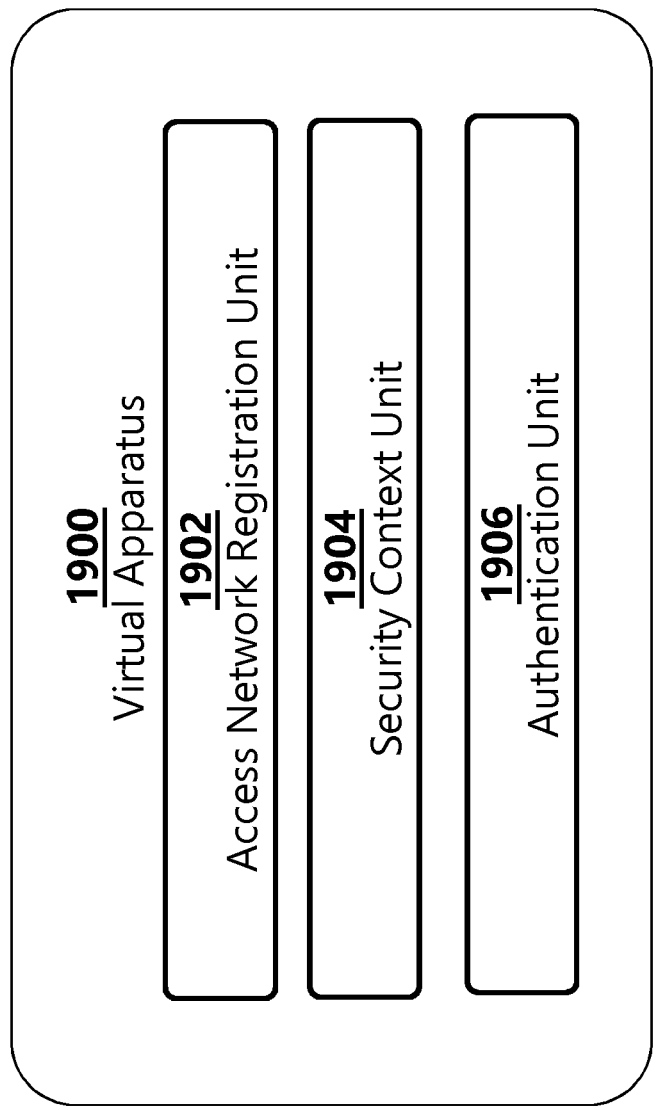
FIG. 19 illustrates an example of a virtualization apparatus, in accordance with some embodiments.

FIG. 19 illustrates a schematic block diagram of an apparatus 1900 in a wireless network (for example, the wireless network shown in FIG. 13). The apparatus may be implemented in a wireless device or network node (e.g., wireless device 110 or network node 160 shown in FIG. 13). Apparatus 1900 is operable to carry out the example method described with reference to FIG. 18 and possibly any other processes or methods disclosed herein. It is also to be understood that the method of FIG. 18 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Network Registration Unit 1902, Security Context Unit 1904, Authentication Unit 1906 and any other suitable units of apparatus 1900 to perform corresponding functions according one or more embodiments of the present disclosure, and any other suitable units of apparatus 1900 to perform corresponding functions according one or more embodiments of the present disclosure.

As illustrated in FIG. 19, apparatus 1900 includes Access Network Registration Unit 1902, Security Context Unit 1904, and Authentication Unit 1906. Access Network Registration Unit 1902 is configured to register a wireless device over two or more access networks. Security Context Unit 1904 is configured to establish a first security context associated with the two or more access networks. Authentication Unit 1906 is configured to participate in a new authentication procedure over a first access network of the two or more access networks. For example, Authentication Unit 1906 may be configured to initiate a new registration or authentication in response to the circumstances of the wireless device and access networks. A second security context is associated with the new authentication procedure. For example, the second security context may be associated with the first access network on which the new authentication procedure the wireless device is participating. The second security context may be used for the first access network and the first security context may be used for other access networks of the two or more access networks.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Figure 20:
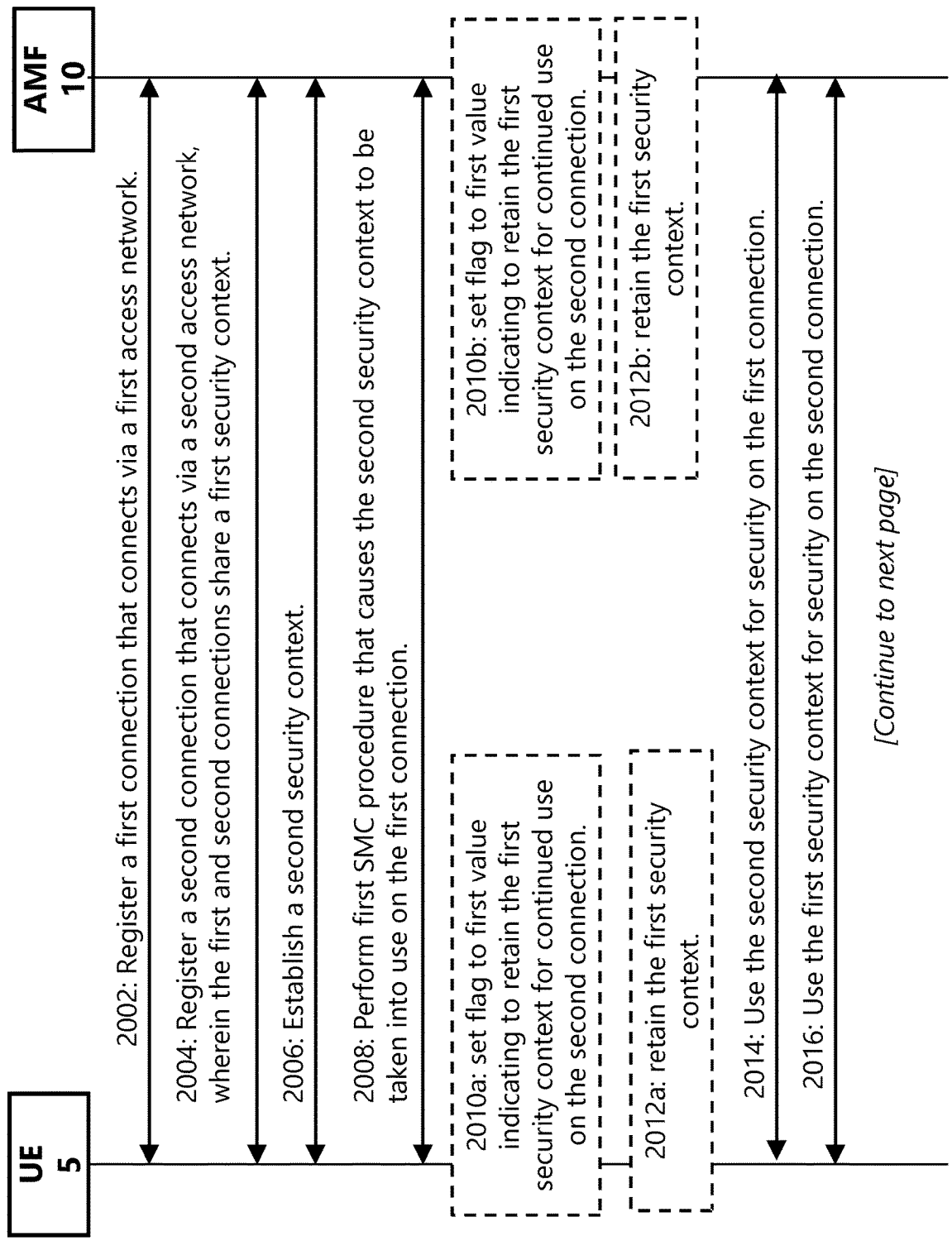
FIG. 20 illustrates an example of a procedure for retaining or disposing of a first security context based on a flag setting, in accordance with certain embodiments.
Figure 20:
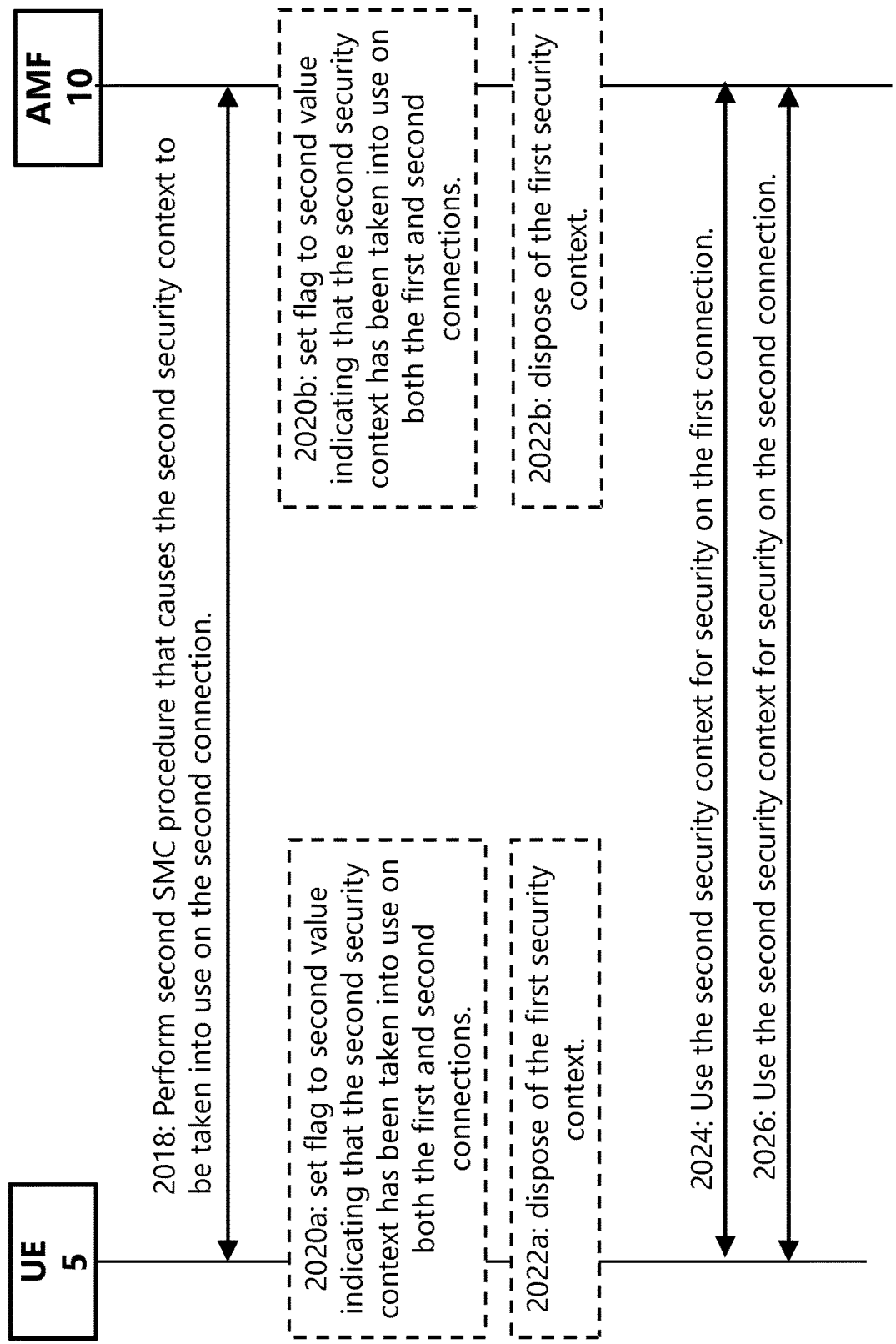
Figure 21:
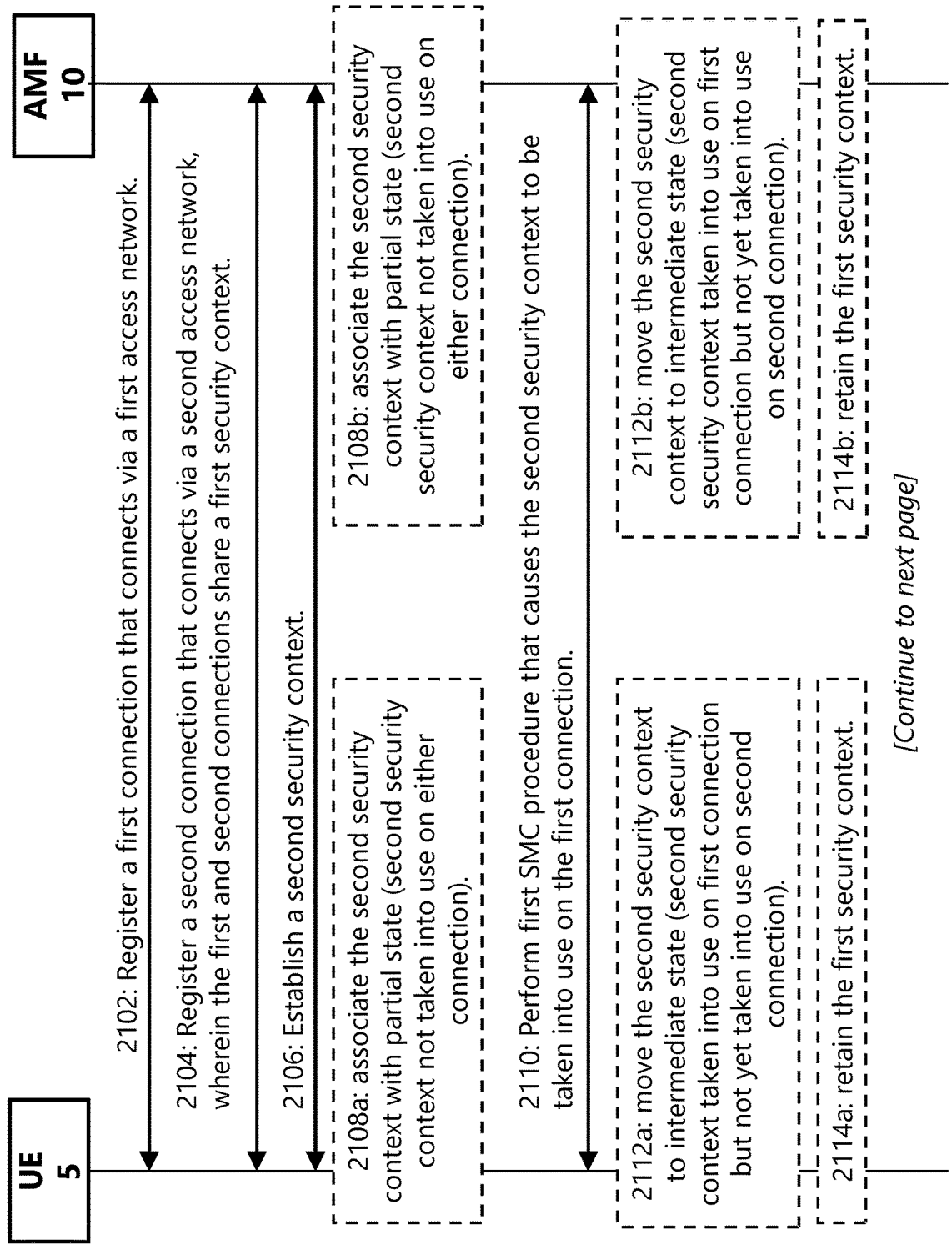
FIG. 21 illustrates an example of a procedure for retaining or disposing of a first security context based whether a second security context is in partial, intermediate, or full state, in accordance with certain embodiments.
Figure 21:
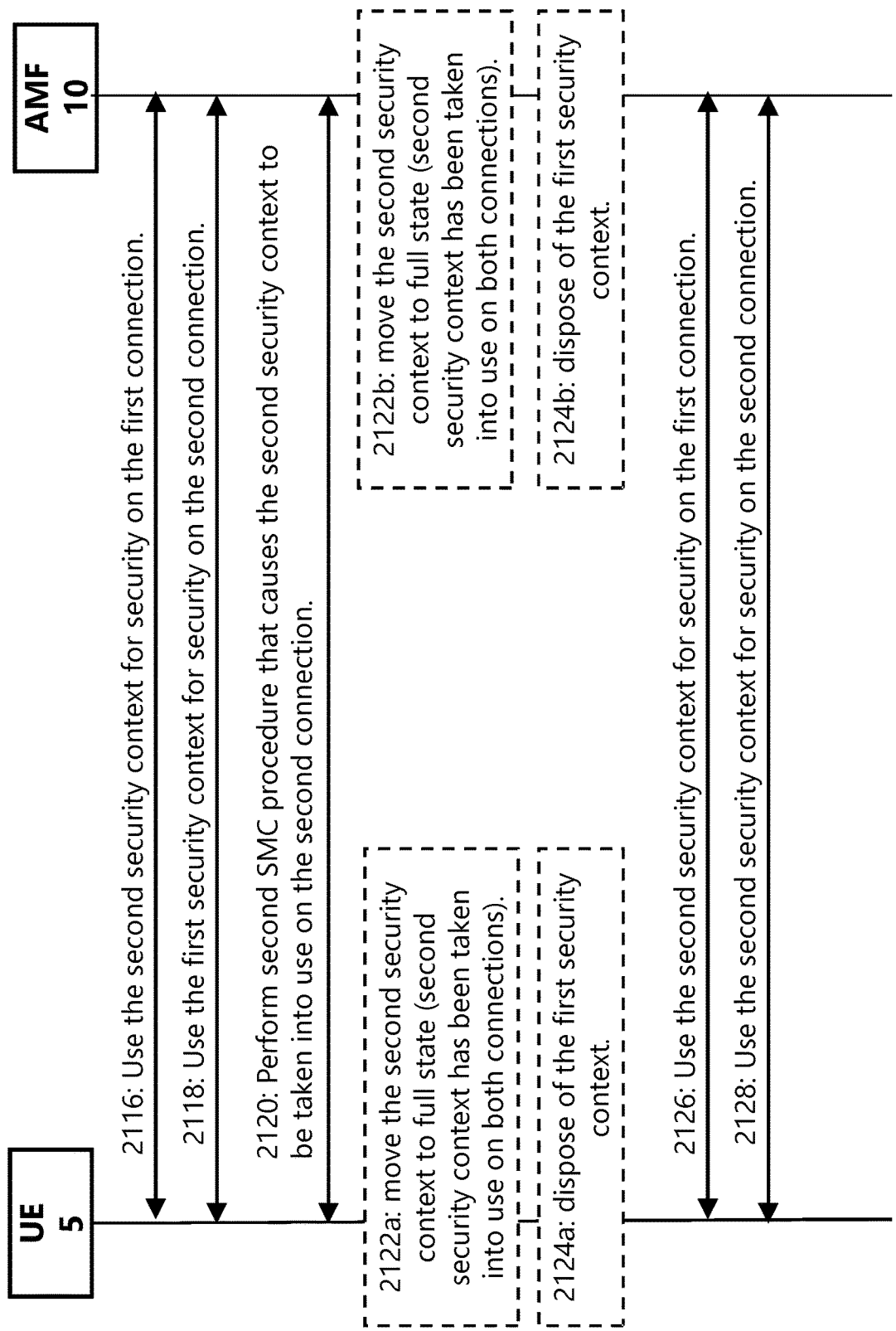
Figure 22:
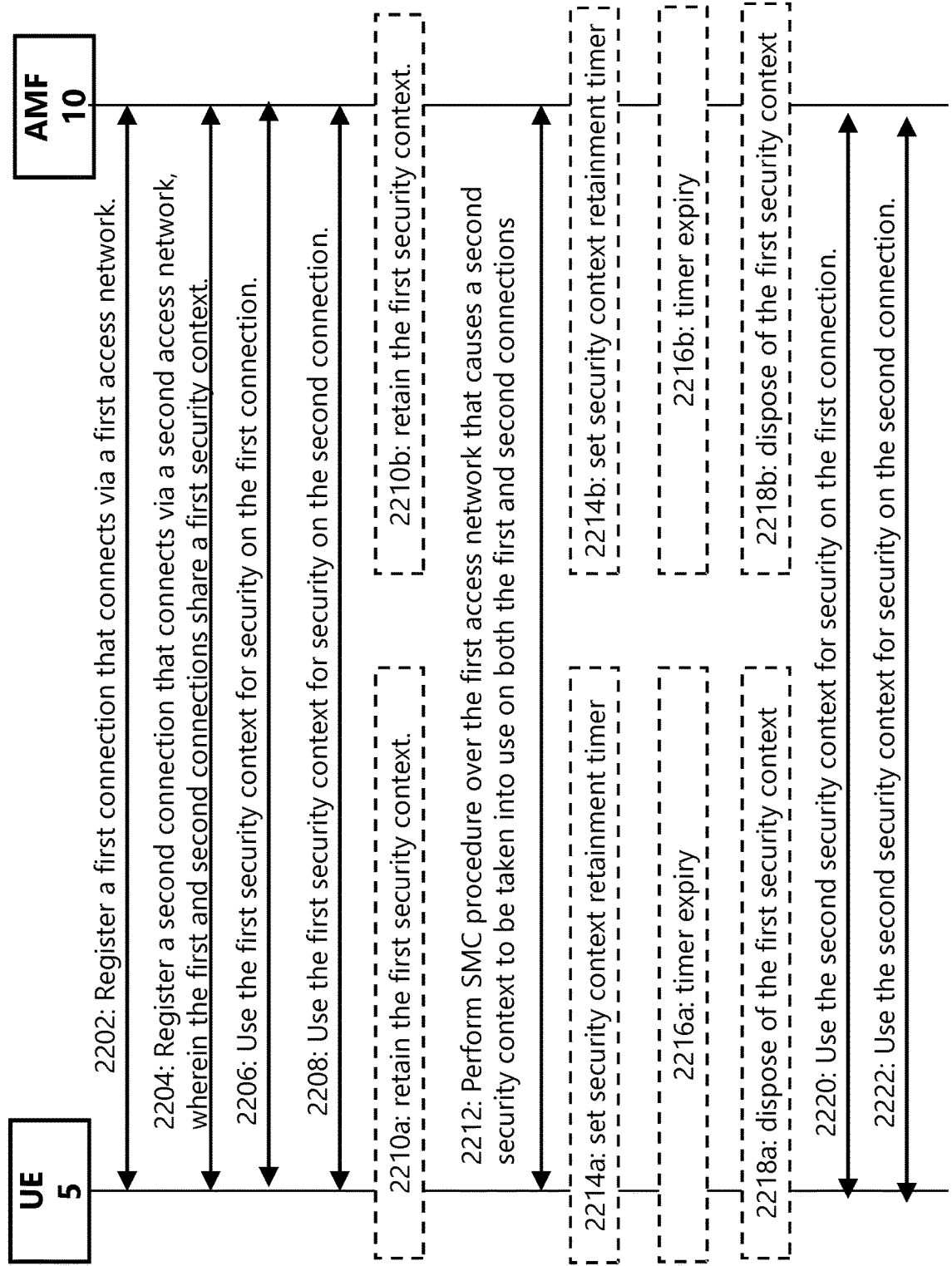
FIG. 22 illustrates an example of a performing an SMC procedure over a first access network in order to take a new security context into use on both a first connection over the first access network and a second connection over a second access network, in accordance with certain embodiments.

FIG. 20-22 are message flow diagrams illustrating examples of methods performed by a wireless device, such as UE 5, and examples of methods performed by a network node, such as AMF 10. Examples of components of wireless devices/UEs are described above with respect to FIGS. 7-11 and 17. Examples of components of a network node/AMF are described above with respect to FIGS. 7-11 and 19. As discussed above, in certain embodiments, the AMF may be implemented in a core network node.

FIG. 20 illustrates an example of a procedure for retaining or disposing of a first security context based on a flag setting, in accordance with certain embodiments. From the perspective of the wireless device, the method comprises registering a first connection with an AMF (step 2002) and registering a second connection with the AMF (step 2004). The first connection connects via a first access network, and the second connection connects via a second access network. The first connection and the second connection share a first security context.

At step 2006, a second security context is established with the AMF. For example, the AMF may trigger an authentication procedure that establishes the second security context between the wireless device and the AMF. In certain embodiments, establishing the second security context means that the wireless device and the AMF agree about the content of the second security context. Examples of such content may include the key KAMF with the associated key set identifier, the UE security capabilities, and the uplink and downlink NAS COUNT values of the second security context, which the wireless device and the AMF can confirm to be valid during the establishing step. In certain embodiments, the second security context may be established based on a successful SMC procedure between the wireless device and the AMF via the first connection.

The second security context may be taken into use in order to use the second security context for security procedures. For example, in certain embodiments, the method proceeds to step 2008 with performing a first SMC procedure (e.g., NAS-SMC procedure) over the first access network. The first SMC procedure causes the second security context to be taken into use on the first connection. At step 2010*a*, the wireless device sets a flag to a first value based on the second security context having been taken into use on the first connection. The first value indicates to retain and continue to use the first security context on the second connection. At step 2012*a*, the wireless device retains the first security context (the wireless device continues to retain the first security context while the flag is set to the first value).

When the flag is set the first value, the wireless device may use the second security context for security on the first connection (step 2014) the first security context for security on the second connection (step 2016).

At step 2018, a second SMC procedure (e.g., NAS-SMC procedure) is performed over the second access network. The second SMC procedure causes the second security context to be taken into use on the second connection. At step 2020*a*, the wireless device sets the flag to a second value based on the second security context having been taken into use on the second connection. The second value indicates that the second security context has been taken into use on both the first connection and the second connection. The wireless device disposes of the first security context after setting the flag to the second value (see step 2022*a*).

When the flag is set to the second value, the wireless device may use the second security context for security on the first connection (step 2024) and for security on the second connection (step 2026). As can be seen, in the example of FIG. 20, the second SMC procedure occurs after the first SMC procedure, setting the flag to the first value occurs after performing the first SMC procedure and before performing the second SMC procedure, and setting the flag to the second value occurs after performing the second SMC procedure.

FIG. 20 also illustrates the method of using a flag from the perspective of a network node, such as an AMF. As can be seen in the example, the steps performed by the AMF are generally analogous to those performed by the wireless device. In FIG. 20, the steps of registering a first connection (step 2002), registering a second connection (2004), establishing a second security context (step 2006), performing SMC procedures (steps 2008 and 2018), and using the security contexts for security (steps 2014, 2016, 2024, and 2026) are performed via message exchange with the wireless device. The AMF may set the flag to the first value (step 2010*b*) based on having taken the second security context into use on the first connection (e.g., based on performing the first SMC procedure). The AMF may set the flag to the second value (step 2020*b*) based on having taken the second security context into use on the second connection (e.g., based on performing the second SMC procedure). The AMF may retain the first security context (step 2012*b*) when the flag is set to the first value and may dispose of the first security context (step 2022*b*) after the flag has been set to the second value.

In certain embodiments, the wireless device may include logic indicating when to set its flag. For example, the wireless device's logic may indicate to set the flag to the first value in response to sending an SMC complete message to the AMF during the first SMC procedure, and to set the flag to the second value in response to sending an SMC complete message to the AMF during the second SMC procedure. Similarly, in certain embodiments, the AMF may include logic for determining when to set its flag. For example, the AMF's logic may indicate to set the flag to the first value in response to receiving an SMC complete message from the wireless device during the first SMC procedure, and to set the flag to the second value in response to receiving an SMC complete message from the wireless device during the second SMC procedure.

For further examples and explanation of the use of a flag, see the above discussion (Scenario B, "Usage of a Flag.")

FIG. 21 illustrates an example of a procedure for retaining or disposing of a first security context based whether a second security context is in partial, intermediate, or full state, in accordance with certain embodiments. From the perspective of the wireless device, the method comprises registering a first connection with an AMF (step 2102) and registering a second connection with the AMF (step 2104). The first connection connects via a first access network, and the second connection connects via a second access network. The first connection and the second connection share a first security context.

At step 2106, a second security context is established with the AMF. For example, the AMF may trigger an authentication procedure that establishes the second security context between the wireless device and the AMF. In certain embodiments, establishing the second security context means that the wireless device and the AMF agree about the content of the second security context. Examples of such content may include the key KAMF with the associated key set identifier, the UE security capabilities, and the uplink and downlink NAS COUNT values of the second security context, which the wireless device and the AMF can confirm to be valid during the establishing step. In certain embodiments, the second security context may be established based on a successful SMC procedure between the wireless device and the AMF via the first connection.

When the second security context is initially established (before the second security context has been taken into use on any connection), the wireless device associates the second security context with a partial state, as shown in step 2108a. The partial state indicates that the second security context has not yet been taken into use on the first connection and that the second security context has not yet been taken into use on the second connection.

The second security context may then be taken into use. For example, in certain embodiments, the method proceeds to step 2110 with performing a first SMC procedure (e.g., NAS-SMC procedure) over the first access network. The first SMC procedure causes the second security context to be taken into use on the first connection.

At step 2112a, after the second security context has been taken into use on the first connection, the wireless device moves the second security context from the partial state to an intermediate state. The intermediate state indicates that the second security context has been taken into use on the first connection and that the second security context has not yet been taken into use on the second connection. Accordingly, the wireless device retains the first security context when the second security context is in the intermediate state (i.e., prior to moving the second security context to the full state), as show in step 2114a. When in the intermediate state, the wireless device may use the second security context for security on the first connection (step 2116) and the first security context for security on the second connection (step 2118).

At step 2120, the wireless device performs a second SMC procedure (e.g., NAS-SMC procedure) that causes the second security context to be taken into use on the second connection. After the second security context has been taken into use on the second connection, the wireless device moves the second security context from the intermediate state to a full state at step 2122a. The full state indicates that the second security context has been taken into use on both the first connection and the second connection. Accordingly, after moving the second security context to the full state, the wireless device may dispose of the first security context, as shown in step 2124a.

When the second security context is in the full state, the wireless device may use the second security context for security on the first connection (step 2126) and the for security on the second connection (step 2128). As can be seen, in the example of FIG. 21, the second SMC procedure occurs after the first SMC procedure, setting the state to the intermediate state occurs after performing the first SMC procedure and before performing the second SMC procedure, and setting the state to the full state occurs after performing the second SMC procedure.

FIG. 21 also illustrates the method of using a flag from the perspective of a network node, such as an AMF. As can be seen in the example, the steps performed by the AMF are generally analogous to those performed by the wireless device. In FIG. 21, the steps of registering a first connection (step 2102), registering a second connection (2104), establishing a second security context (step 2106), performing SMC procedures (steps 2110 and 2120), and using the security contexts for security (steps 2116, 2118, 2126, and 2128) are performed via message exchange with the wireless device. The second security context may be in partial state when first established (step 2108b). The AMF may move the second security context to an intermediate state (step 2112b) based on having taken the second security context into use on the first connection (e.g., based on performing the first SMC procedure). The AMF may move the second security context to a full state (step 2020b) based on having taken the second security context into use on the second connection (e.g., based on performing the second SMC procedure). The AMF may retain the first security context (step 2114b) prior to moving the second security context into full state and may dispose of the first security context (step 2124b) after moving the second security context into full state.

In certain embodiments, the wireless device may include logic indicating when to change the state that the wireless device associates with the second security context. For example, the wireless device's logic may indicate to move the second security context to the intermediate state in response to sending an SMC complete message to the AMF during the first SMC procedure, and to move the second security context to the full state in response to sending an SMC complete message to the AMF during the second SMC procedure. Similarly, in certain embodiments, the AMF may include logic for determining when to change the state that the AMF associates with the second security context. For example, the AMF's logic may indicate to move the second security context to the intermediate state in response to receiving an SMC complete message from the wireless device during the first SMC procedure, and to move the second security context to full state in response to receiving an SMC complete message from the wireless device during the second SMC procedure.

For further examples and explanation of the use of an intermediate state, see the above discussion ("Second Concept: Intermediate State between partial and full.")

FIG. 22 illustrates an example of performing an SMC procedure over a first access network in order to take a new security context into use on both a first connection over the first access network and a second connection over a second access network, in accordance with certain embodiments.

From the perspective of the wireless device, the method comprises registering a first connection with an AMF (step 2202) and registering a second connection with the AMF (step 2204). The first connection connects via a first access network, and the second connection connects via a second access network. The first connection and the second connection share a first security context. Thus, the first security context may be used for security on both the first connection (step 2206) and the second connection (step 2208). The wireless device retains the first security context during this time, as shown in step 2210*a*.

At step 2212, the wireless device may perform an SMC procedure (e.g., NAS-SMC procedure) with the AMF. The SMC procedure causes a second security context to be taken into use. As an example, in some embodiments, the second security context may have been established in an authentication procedure with the AMF (e.g., an authentication procedure that occurs after steps 2202 and 2204 and prior to step 2212). The SMC procedure of step 2212 is performed over the first access network, and it causes the second security context to be taken into use on both the first and second connections. After performing the SMC procedure of step 2212, the wireless device disposes of the first security context, as shown in step 2218*a*. Optionally, certain embodiments may use a security context retainment timer to determine when to dispose of the first security context. For example, the SMC procedure of step 2212 may trigger the starting of the security context retainment timer in step 2214*a*. The wireless device determines that the security context retainment timer expires in step 2216*a* and disposes of the first security context after determining that the security context retainment timer has expired.

After performing the SMC procedure that takes the second security context into use on both the first and second connections, the wireless device uses the second security context for security on the first connection (step 2220) and for security on the second connection (step 2222).

FIG. 22 also illustrates the method from the perspective of a network node, such as an AMF. As can be seen in the example, the steps performed by the AMF are generally analogous to those performed by the wireless device. The steps of registering a first connection (step 2202), registering a second connection (2204), using the security contexts for security (steps 2206, 2208, 2220, and 2222), and performing SMC procedures (step 2212) are performed via message exchange with the wireless device. The AMF may retain the first security context prior to the second security context being taken into use (step 2210*b*) and may dispose of the first security context after the second security context has been taken into use (step 2218*b*). Optionally, certain embodiments may use a security context retainment timer to determine when to dispose of the first security context. For example, the SMC procedure of step 2212 may trigger the starting of the security context retainment timer in step 2214*b*. The AMF determines that the security context retainment timer expires in step 2216*b* and disposes of the first security context after determining that the security context retainment timer has expired.

In certain embodiments, the wireless device may include logic indicating when to retain and dispose of the first security context. For example, the wireless device's logic may indicate to retain the first security context prior to performing the SMC procedure that causes the second security context to be taken into use on both the first and second connections, and to dispose of the first security context after performing the SMC procedure that causes the second security context to be taken into use on both the first and second connections. In embodiments that use a security context retainment timer, the wireless device's logic may indicate when the wireless device should start its security context retainment timer. In an embodiment, the wireless device may start its security context retainment timer in response to sending an SMC complete message to the AMF as part of the SMC procedure. Similarly, in certain embodiments, the AMF may include logic indicating when to retain and dispose of the first security context. For example, the AMF's logic may indicate to retain the first security context prior to performing the SMC procedure that causes the second security context to be taken into use on both the first and second connections, and to dispose of the first security context after performing the SMC procedure that causes the second security context to be taken into use on both the first and second connections. In embodiments that use a security context retainment timer, the AMF's logic may indicate when the AMF should start its security context retainment timer. In an embodiment, the AMF may start its security context retainment timer in response to receiving an SMC complete message from the wireless device as part of the SMC procedure.

For further examples and explanation of an SMC procedure to take a new security context into use on both a first connection over the first access network and a second connection, see FIG. 5 above.

ADDITIONAL EXAMPLE EMBODIMENTS

Group A Embodiments

1. A method performed by a wireless device for managing security for connections, the method comprising:
   registering the wireless device over two or more access networks;
   establishing a first security context associated with the two or more access networks;
   participating in a new authentication procedure over a first access network of the two or more access networks, wherein a second security context is associated with the new authentication procedure; and
   using the second security context for the first access network and using the first security context for other access networks of the two or more access networks.
2. The method of any of the previous embodiments, starting a context retainment timer, wherein the first security context remains valid while the context retainment timer is running
3. The method of any of the previous embodiments, further comprising receiving a security mode command message and wherein starting the context retainment timer is in response to receiving the security mode command message.
4. The method of any of the previous embodiments, further comprising determining the context retainment timer has expired and, in response, disposing of the first security context.
5. The method of embodiment 4, wherein the wireless device cannot use the first security context over any of the two or more access networks after disposing of the first security context.
6. The method of embodiment 1, further comprising using the first security context for other access networks of the two or more access networks until a new authentication procedure is completed over all of the two or more access networks.

7. The method of embodiments 1 and 6, wherein the second security context is associated with an intermediate state after completing a security mode command procedure with the first access network, wherein the second security context is used for the first access network and the first security context is used for other access networks of the two or more access networks when the second security context is associated with the intermediate state.

8. The method of embodiment 7, further comprising completing a security mode command procedure with each of the other access networks, wherein the second security context is no longer associated with the intermediate state after completing a security mode command procedure with each of the other access networks.

9. The method of embodiment 8, further comprising using the second security context for the other access networks when the second security context is not associated with the intermediate state.

10. The method of any of embodiments 7-9, disposing of the first security context when the second security context is no longer associated with the intermediate state.

11. The method of embodiment 10, wherein the wireless device cannot use the first security context over any of the two or more access networks after disposing of the first security context.

12. The method of embodiments 1 and 6, further comprising setting a flag associated with the first security context to a first state after participating in the new authentication procedure over a first access network of the two or more access networks.

13. The method of embodiment 12, wherein the second security context is used for the first access network and the first security context is used for other access networks of the two or more access networks when the flag is set to the first state.

14. The method of embodiment 13, further comprising completing a security mode command procedure with each of the other access networks and, in response, setting the flag to a second state.

15. The method of embodiment 14, further comprising using the second security context for the other access networks when the flag is set to a second state.

16. The method of any of embodiments 13-15, disposing of the first security context when the flag is set to a second state.

17. The method of embodiment 16, wherein the wireless device cannot use the first security context over any of the two or more access networks after disposing of the first security context.

18. The method of any of the previous embodiments, further comprising the step of sending a registration request to a network node implementing a authentication management function.

19. The method of any of the previous embodiments, further comprising responding to security mode command message.

20. The method of any of the previous embodiments, further comprising using the second security context over the first access network.

21. The method of any of the previous embodiments, further comprising:
providing user data; and
forwarding the user data to a host computer via the transmission to the base station.

Group B Embodiments

22. A method performed by a network node for managing security for connections, the method comprising:
registering a wireless device over two or more access networks;
establishing a first security context associated with the two or more access networks;
participating in a new authentication procedure over a first access network of the two or more access networks, wherein a second security context is associated with the new authentication procedure; and
authenticating the wireless device for the first access network using the second security context and for the other access networks of the two or more access networks using the first security device.

23. The method of any of the previous embodiments, starting a context retainment timer, wherein the first security context remains valid while the context retainment timer is running 24. The method of any of the previous embodiments, further comprising transmitting a security mode command message and wherein starting the context retainment timer is before transmitting the security mode command message.

25. The method of any of the previous embodiments, further comprising determining the context retainment timer has expired and, in response, disposing of the first security context.

26. The method of embodiment 22, wherein the first security context is not valid over any of the two or more access networks after disposing of the first security context.

27. The method of embodiment 22, further comprising wherein the first security context is used for other access networks of the two or more access networks until a new authentication procedure is completed over all of the two or more access networks.

28. The method of embodiments 22 and 27, further comprising associating the second security context with an intermediate state after completing a security mode command procedure with the first access network, wherein the second security context is used for the first access network and the first security context is used for other access networks of the two or more access networks when the second security context is associated with the intermediate state.

29. The method of embodiment 28, further comprising completing a security mode command procedure with each of the other access networks, and disassociating the second security context with the intermediate state after completing a security mode command procedure with each of the other access networks.

30. The method of embodiment 29, further comprising the second security context is used for the other access networks after disassociating the second security context with the intermediate state.

31. The method of any of embodiments 28-30, disposing of the first security context when the second security context after disassociating the second security context with the intermediate state.

32. The method of embodiment 31, wherein the first security context is invalid for use over any of the two or more access networks after disposing of the first security context.
33. The method of embodiments 22 and 27, further comprising setting a flag associated with the first security context to a first state after participating in the new authentication procedure over a first access network of the two or more access networks.
34. The method of embodiment 33, wherein the second security context is used for the first access network and the first security context is used for other access networks of the two or more access networks when the flag is set to the first state.
35. The method of embodiment 34, further comprising completing a security mode command procedure with each of the other access networks and, in response, setting the flag to a second state.
36. The method of embodiment 35, wherein the second security context is used by the wireless device for the other access networks when the flag is set to a second state.
37. The method of any of embodiments 34-36, disposing of the first security context when the flag is set to a second state.
38. The method of embodiment 37, wherein the first security context is no longer valid over any of the two or more access networks after disposing of the first security context.
39. The method of any of the previous embodiments, wherein the network node implements a authentication management function.
40. The method of any of the previous embodiments, further comprising sending to security mode command message to the wireless device.
41. The method of any of the previous embodiments, further comprising:
   obtaining user data; and
   forwarding the user data to a host computer or a wireless device.

Group C Embodiments

42. A wireless device for managing security for connections, the wireless device comprising:
   processing circuitry configured to perform any of the steps of any of the Group A embodiments; and
   power supply circuitry configured to supply power to the wireless device.
43. A network node for managing security for connections, the network node comprising:
   processing circuitry configured to perform any of the steps of any of the Group B embodiments;
   power supply circuitry configured to supply power to the wireless device.
44. A user equipment (UE) for managing security for connections, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.
45. A computer program, the computer program comprising instructions which when executed on a computer perform any of the steps of any of the Group A embodiments.
46. A computer program product comprising a computer program, the computer program comprising instructions which when executed on a computer perform any of the steps of any of the Group A embodiments.
47. A non-transitory computer-readable storage medium or carrier comprising a computer program, the computer program comprising instructions which when executed on a computer perform any of the steps of any of the Group A embodiments.
48. A computer program, the computer program comprising instructions which when executed on a computer perform any of the steps of any of the Group B embodiments.
49. A computer program product comprising a computer program, the computer program comprising instructions which when executed on a computer perform any of the steps of any of the Group B embodiments.
50. A non-transitory computer-readable storage medium or carrier comprising a computer program, the computer program comprising instructions which when executed on a computer perform any of the steps of any of the Group B embodiments.
51. A communication system including a host computer comprising:
   processing circuitry configured to provide user data; and
   a communication interface configured to forward the user data to a cellular network for transmission to a user equipment (UE),
   wherein the cellular network comprises a network node having a radio interface and processing circuitry, the network node's processing circuitry configured to perform any of the steps of any of the Group B embodiments.
52. The communication system of the pervious embodiment further including the network node.
53. The communication system of the previous 2 embodiments, further including the UE, wherein the UE is configured to communicate with the network node.
54. The communication system of the previous 3 embodiments, wherein:
   the processing circuitry of the host computer is configured to execute a host application, thereby providing the user data; and
   the UE comprises processing circuitry configured to execute a client application associated with the host application.
55. A method implemented in a communication system including a host computer, a network node and a user equipment (UE), the method comprising:
   at the host computer, providing user data; and
   at the host computer, initiating a transmission carrying the user data to the UE via a cellular network comprising the network node, wherein the network node performs any of the steps of any of the Group B embodiments.
56. The method of the previous embodiment, further comprising, at the network node, transmitting the user data.
57. The method of the previous 2 embodiments, wherein the user data is provided at the host computer by executing a host application, the method further comprising, at the UE, executing a client application associated with the host application.
58. A user equipment (UE) configured to communicate with a network node, the UE comprising a radio interface and processing circuitry configured to performs the of the previous 3 embodiments.
59. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of the Group A embodiments.
60. The communication system of the previous embodiment, wherein the cellular network further includes a network node configured to communicate with the UE.
61. The communication system of the previous 2 embodiments, wherein:
   the processing circuitry of the host computer is configured to execute a host application, thereby providing the user data; and
   the UE's processing circuitry is configured to execute a client application associated with the host application.
62. A method implemented in a communication system including a host computer, a network node and a user equipment (UE), the method comprising:
   at the host computer, providing user data; and
   at the host computer, initiating a transmission carrying the user data to the UE via a cellular network comprising the network node, wherein the UE performs any of the steps of any of the Group A embodiments.
63. The method of the previous embodiment, further comprising at the UE, receiving the user data from the network node.
64. A communication system including a host computer comprising:
   communication interface configured to receive user data originating from a transmission from a user equipment (UE) to a network node,
   wherein the UE comprises a radio interface and processing circuitry, the UE's processing circuitry configured to perform any of the steps of any of the Group A embodiments.
65. The communication system of the previous embodiment, further including the UE.
66. The communication system of the previous 2 embodiments, further including the network node, wherein the network node comprises a radio interface configured to communicate with the UE and a communication interface configured to forward to the host computer the user data carried by a transmission from the UE to the network node.
67. The communication system of the previous 3 embodiments, wherein:
   the processing circuitry of the host computer is configured to execute a host application; and
   the UE's processing circuitry is configured to execute a client application associated with the host application, thereby providing the user data.
68. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.
69. A method implemented in a communication system including a host computer, a network node and a user equipment (UE), the method comprising:
   at the host computer, receiving user data transmitted to the network node from the UE, wherein the UE performs any of the steps of any of the Group A embodiments.
70. The method of the previous embodiment, further comprising, at the UE, providing the user data to the network node.
71. The method of the previous 2 embodiments, further comprising:
   at the UE, executing a client application, thereby providing the user data to be transmitted; and
   at the host computer, executing a host application associated with the client application.
72. The method of the previous 3 embodiments, further comprising:
   at the UE, executing a client application; and
   at the UE, receiving input data to the client application, the input data being provided at the host computer by executing a host application associated with the client application,
   wherein the user data to be transmitted is provided by the client application in response to the input data.
73. A communication system including a host computer comprising a communication interface configured to receive user data originating from a transmission from a user equipment (UE) to a network node, wherein the network node comprises a radio interface and processing circuitry, the network node's processing circuitry configured to perform any of the steps of any of the Group B embodiments.
74. The communication system of the previous embodiment further including the network node.
75. The communication system of the previous 2 embodiments, further including the UE, wherein the UE is configured to communicate with the network node.
76. The communication system of the previous 3 embodiments, wherein:
   the processing circuitry of the host computer is configured to execute a host application;
   the UE is configured to execute a client application associated with the host application, thereby providing the user data to be received by the host computer.
77. A method implemented in a communication system including a host computer, a network node and a user equipment (UE), the method comprising:
   at the host computer, receiving, from the network node, user data originating from a transmission which the network node has received from the UE, wherein the UE performs any of the steps of any of the Group A embodiments.

78. The method of the previous embodiment, further comprising at the network node, receiving the user data from the UE.

79. The method of the previous 2 embodiments, further comprising at the network node, initiating a transmission of the received user data to the host computer.

The invention claimed is:

1. A method for use in a wireless device, the method comprising:
registering a first connection and a second connection with an authentication management function (AMF), wherein the first connection connects via a first access network, the second connection connects via a second access network, and the first connection and the second connection share a first security context;
performing a Security Mode Command (SMC) procedure with the AMF over the first access network, wherein the SMC procedure performed over the first access network causes a second security context to be taken into use on both the first connection and the second connection;
retaining the first security context prior to performing the SMC procedure;
starting a security context retainment timer;
using the first security context for security on the second connection and using the second security context for security on the first connection;
determining that the security context retainment timer has expired;
disposing of the first security context after performing the SMC procedure.

2. The method of claim 1, further comprising:
using the first security context for security on the first connection and the second connection prior to performing the SMC procedure; and
using the second security context for security on the first connection and the second connection after performing the SMC procedure.

3. The method of claim 1, wherein performing the SMC procedure triggers the starting of the security context retainment timer.

4. The method of claim 1, further comprising:
using the second security context for security on the first connection and the second connection after expiry of the security context retainment timer.

5. A method for use in a network node providing an authentication management function (AMF), the method comprising:
registering a first connection and a second connection of a wireless device, wherein the first connection connects via a first access network, the second connection connects via a second access network, and the first connection and the second connection share a first security context;
performing a Security Mode Command (SMC) procedure with the wireless device over the first access network, wherein the SMC procedure performed over the first access network causes a second security context to be taken into use on both the first connection and the second connection;
retaining the first security context prior to performing the SMC procedure;
starting a security context retainment timer;
using the first security context for security on the second connection and using the second security context for security on the first connection;
determining that the security context retainment timer has expired;
disposing of the first security context after performing the SMC procedure.

6. The method of claim 5 further comprising:
using the first security context for security on the first connection and the second connection prior to performing the SMC procedure; and
using the second security context for security on the first connection and the second connection after performing the SMC procedure.

7. The method of claim 5, wherein performing the SMC procedure triggers the starting of the security context retainment timer.

8. The method of claim 5, further comprising:
using the second security context for security on the first connection and the second connection after expiry of the security context retainment timer.

9. A wireless device comprising processing circuitry configured to:
register a first connection and a second connection with an authentication management function (AMF), wherein the first connection connects via a first access network, the second connection connects via a second access network, and the first connection and the second connection share a first security context;
perform a Security Mode Command (SMC) procedure with the AMF over the first access network, wherein the SMC procedure performed over the first access network causes a second security context to be taken into use on both the first connection and the second connection;
retain the first security context prior to performing the SMC procedure;
start a security context retainment timer;
using the first security context for security on the second connection and using the second security context for security on the first connection;
determine that the security context retainment timer has expired;
dispose of the first security context after performing the SMC procedure.

10. The wireless device of claim 9 further configured to:
use the first security context for security on the first connection and the second connection prior to performing the SMC procedure; and
use the second security context for security on the first connection and the second connection after performing the SMC procedure.

11. The wireless device of claim 9, wherein performing the SMC procedure triggers the starting of the security context retainment timer.

12. The wireless device of claim 9, further configured to:
use the second security context for security on the first connection and the second connection after expiry of the security context retainment timer.

13. A network node comprising processing circuitry configured to:
register a first connection and a second connection of a wireless device, wherein the first connection connects via a first access network, the second connection connects via a second access network, and the first connection and the second connection share a first security context;

perform a Security Mode Command (SMC) procedure with the wireless device over the first access network, wherein the SMC procedure performed over the first access network causes a second security context to be taken into use on both the first connection and the second connection;

retain the first security context prior to performing the SMC procedure;

start a security context retainment timer;

using the first security context for security on the second connection and using the second security context for security on the first connection;

determine that the security context retainment timer has expired;

dispose of the first security context after performing the SMC procedure.

14. The network node of claim 13, further configured to:

use the first security context for security on the first connection and the second connection prior to performing the SMC procedure; and use the second security context for security on the first connection and the second connection after performing the SMC procedure.

15. The network node of claim 13, wherein performing the SMC procedure triggers the starting of the security context retainment timer.

16. The network node of claim 13, further configured to:

use the second security context for security on the first connection and the second connection after expiry of the security context retainment timer.

* * * * *